(12) United States Patent
Tabata et al.

(10) Patent No.: US 7,209,266 B2
(45) Date of Patent: Apr. 24, 2007

(54) IMAGE PROCESSING APPARATUS

(75) Inventors: Sunao Tabata, Mishima (JP); Hiroki Kanno, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 878 days.

(21) Appl. No.: 10/310,800

(22) Filed: Dec. 6, 2002

(65) Prior Publication Data

US 2005/0030569 A1 Feb. 10, 2005

(51) Int. Cl.
*H04N 1/04* (2006.01)

(52) U.S. Cl. .............. 358/474; 358/539; 358/426.13; 358/500; 382/248; 382/251

(58) Field of Classification Search ........ 358/474, 358/539, 426.13, 500, 530; 382/248, 251
See application file for complete search history.

(56) References Cited

U.S. PATENT DOCUMENTS

| | | | | |
|---|---|---|---|---|
| 5,469,273 A | * | 11/1995 | Demura | 382/244 |
| 5,506,580 A | * | 4/1996 | Whiting et al. | 341/51 |
| 5,801,841 A | * | 9/1998 | Suzuki | 382/234 |
| 5,832,129 A | * | 11/1998 | Horiuchi et al. | 382/248 |
| 6,342,950 B1 | * | 1/2002 | Tabata et al. | 358/1.6 |

FOREIGN PATENT DOCUMENTS

| | | |
|---|---|---|
| JP | 2698034 | 9/1997 |
| JP | 11-69164 | 3/1999 |
| JP | 2000-115249 | 4/2000 |

OTHER PUBLICATIONS

U.S. Appl. No. 10/054,990, Tabata et al.

* cited by examiner

*Primary Examiner*—Douglas Q. Tran
*Assistant Examiner*—Negusie Worku
(74) *Attorney, Agent, or Firm*—Foley & Lardner LLP

(57) ABSTRACT

Without repeating compression/decompression operations, an editing process such as rotation can be executed using first compression data, and second compression data, whose compression ratio is increased, can be stored in a hard disk drive.

8 Claims, 22 Drawing Sheets

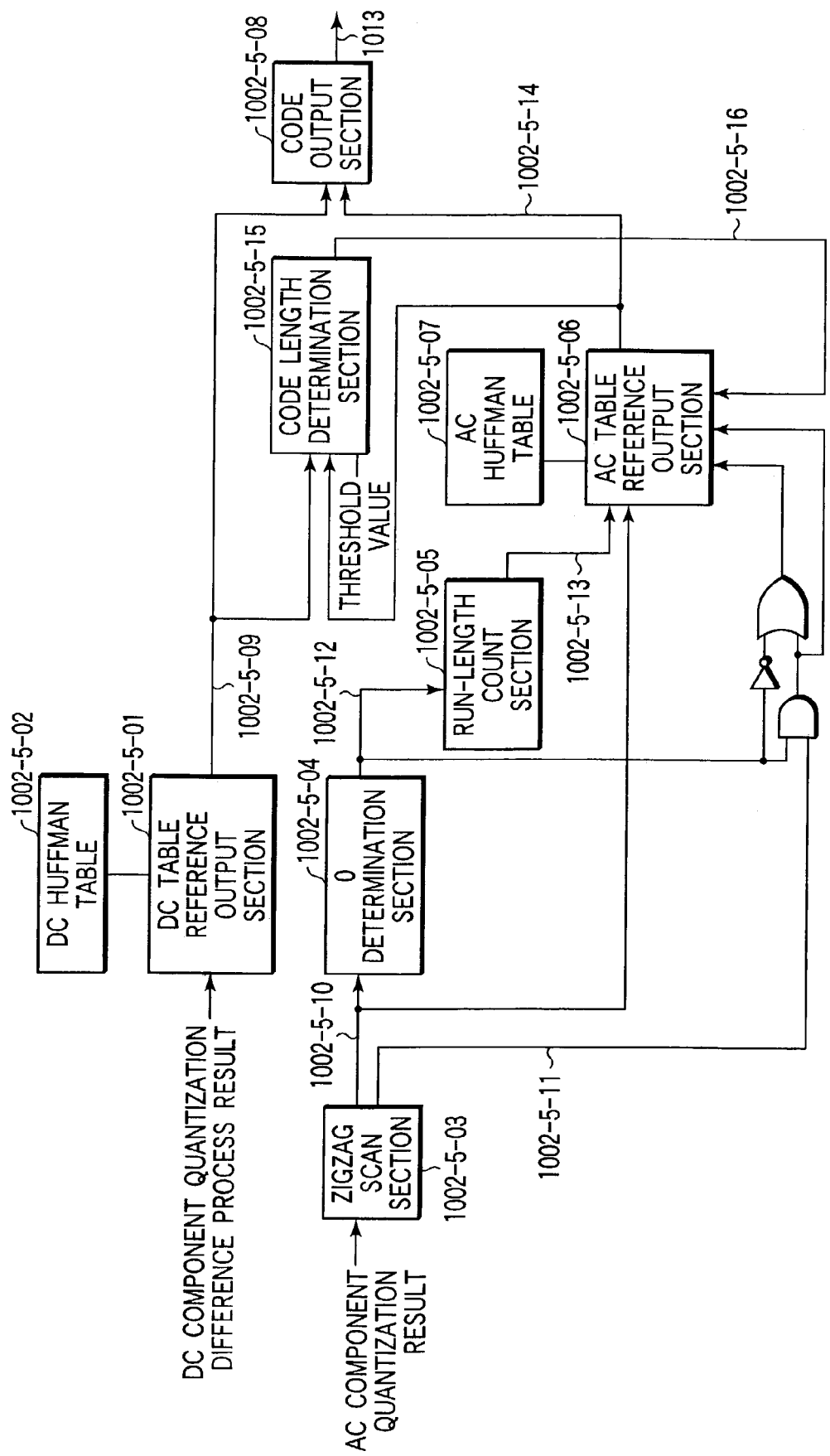
F I G. 8

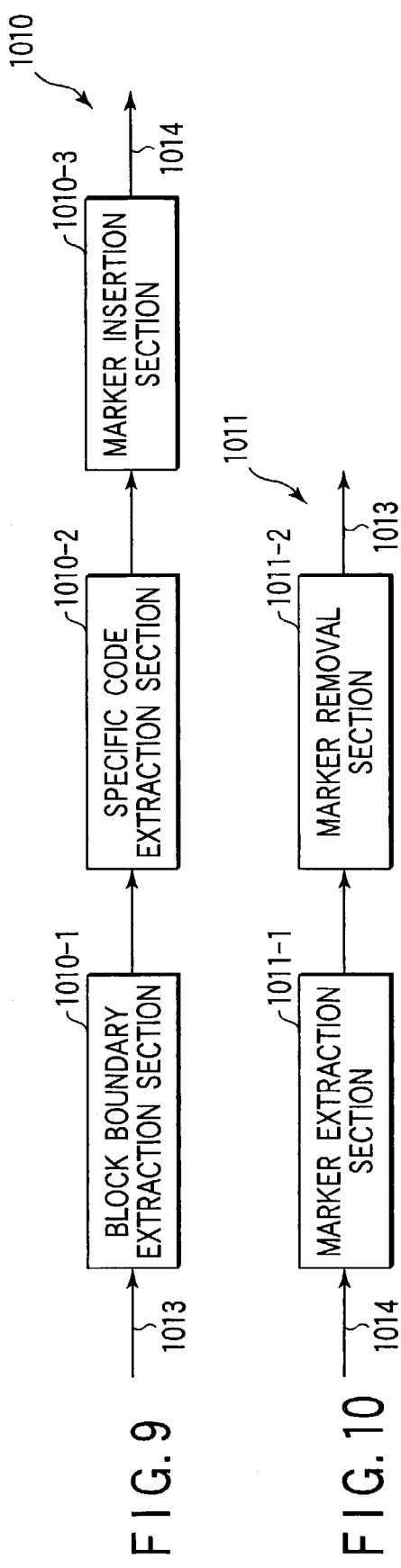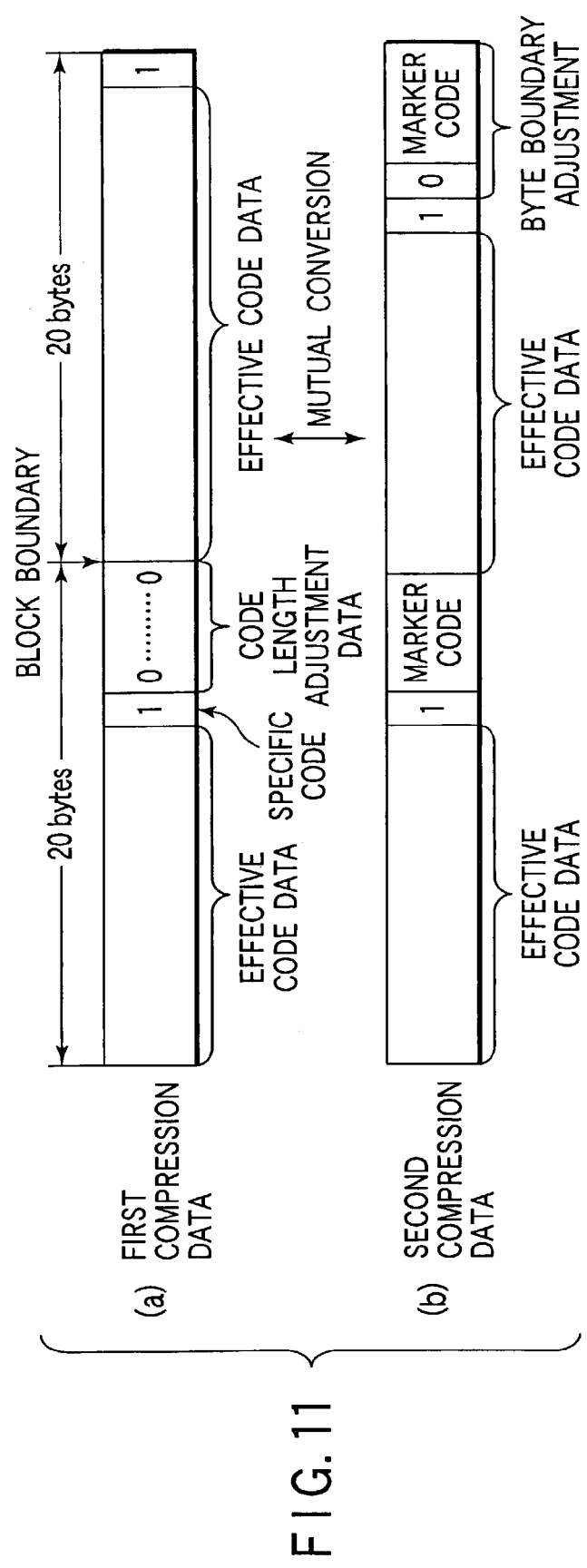
FIG. 9
FIG. 10
FIG. 11

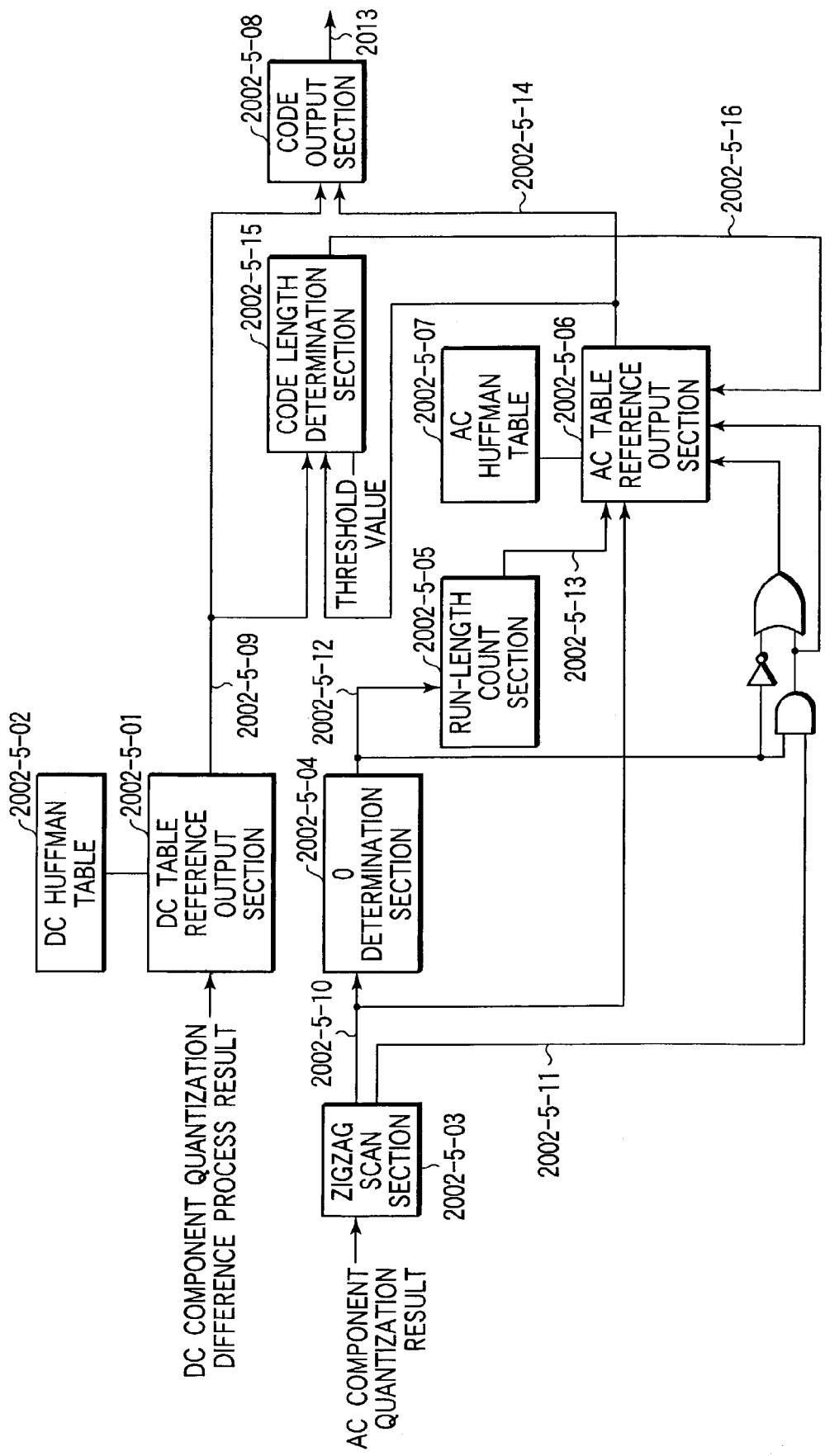
F I G. 17

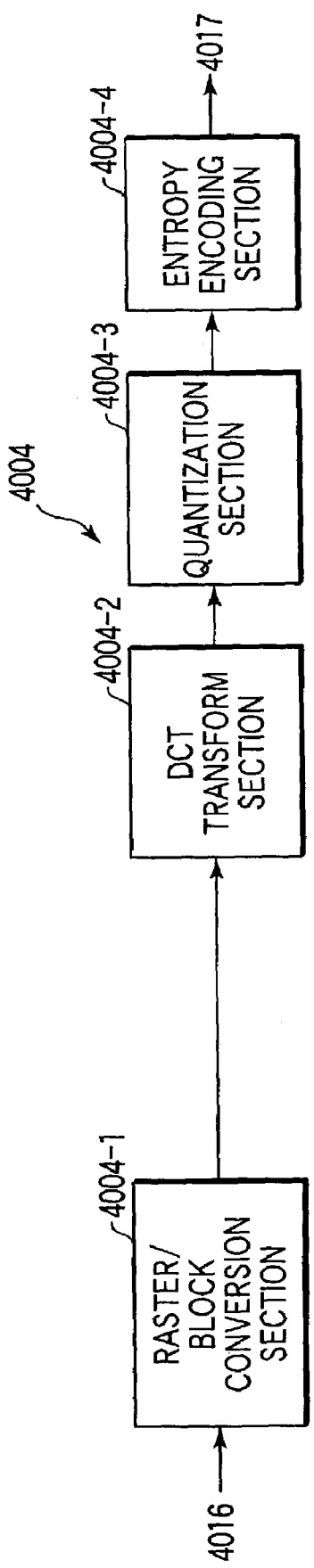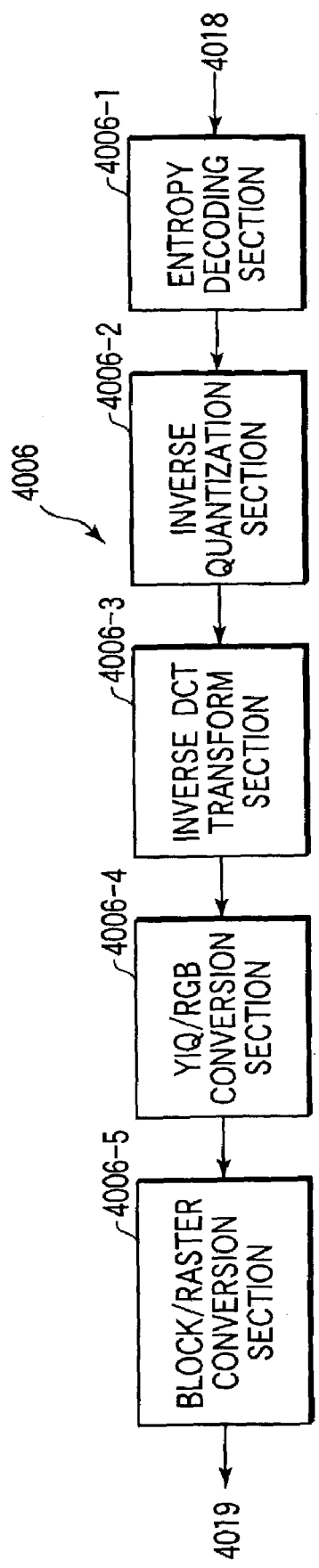
FIG. 27
FIG. 28

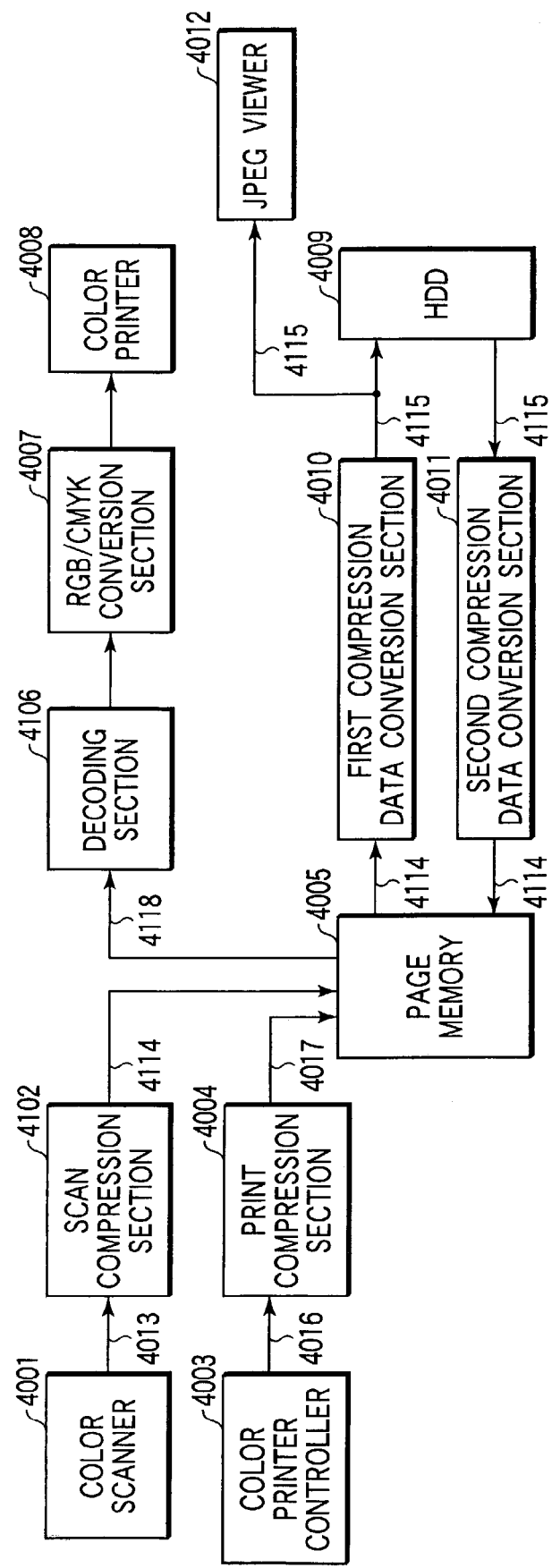
F I G. 29

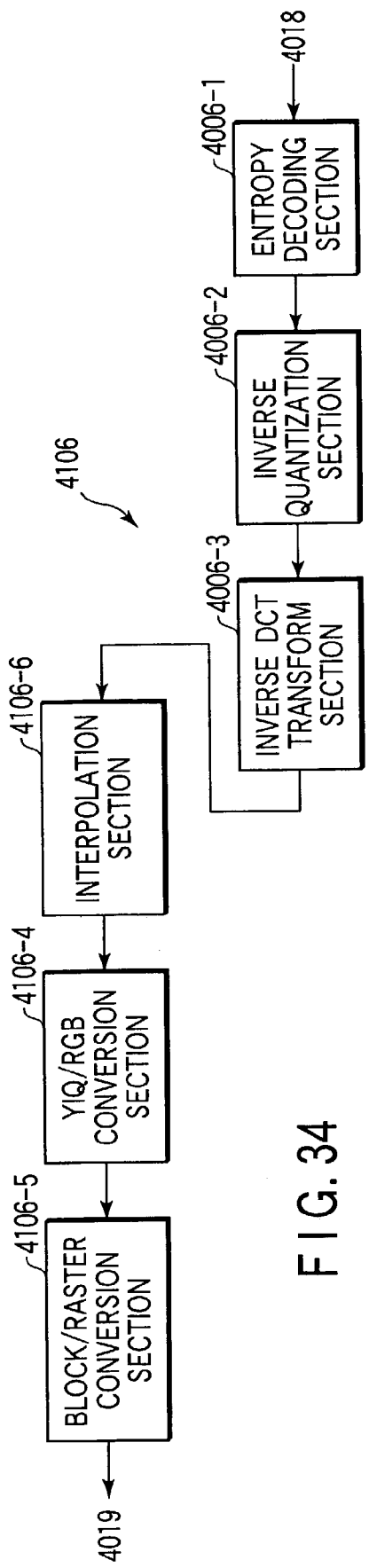
F I G. 34
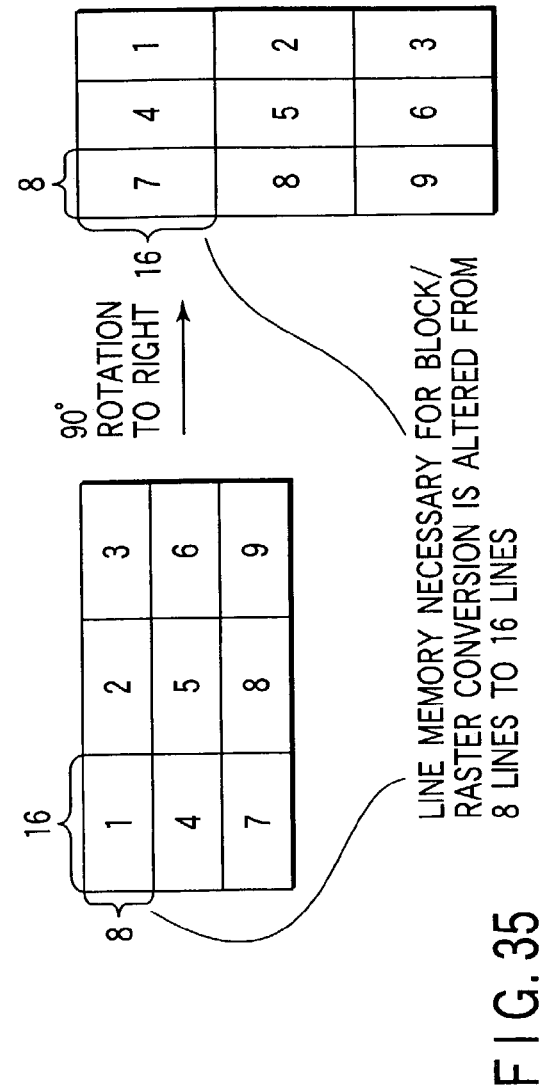
F I G. 35

IMAGE PROCESSING APPARATUS

BACKGROUND OF THE INVENTION

The present invention relates to an image processing apparatus that performs an image process for an input color image, for example, in a digital color copying machine that reads a color image on an original and forms a copy image thereof.

Conventionally, copying machines with a single function of copying have been predominant. However, with recent development of digital technology, MFPs (Multi-Function Peripherals) with multiple functions, such as a copying function, a scanning function and a printing function, have increasingly been manufactured and marketed.

A method disclosed in Jpn. Pat. Appln. KOKAI Publication No. 11-69164 is a senior invention of the inventor of the present invention, which relates to a digital color copying machine. In the senior invention, an image is fixed-length compressed in units of a block, thereby realizing an editing function such as a rotational process function at low cost. In addition, the fixed-length compressed data is then variable-length compressed, and the variable-length compressed data is stored in a hard disk drive (HDD), thus realizing electronic sorting.

The senior invention, however, is silent on how to compress data in the scan, print and copy modes in an MFP.

In the MFP, the number of colors represented by image signals and the use thereof are different in the respective processes of scanning, printing and copying. If different compression techniques are applied to the respective processes, the cost rises due to provision of a plurality of compression means and the productivity lowers due to mutual conversion of compressed data. The difference in compression technique results in such a problem that the data used in the copying and scanning processes, which use input images from the same device, cannot equally be handled for display, management, etc.

Furthermore, as regards the MFP configuration, it is difficult to increase the system extensibility at low cost, by connecting not only units for color scan and color print or units for black-and-white scan and black-and-white print, but also units for color scan and black-and-white print, or the like, wherein the number of signals in devices is different.

BRIEF SUMMARY OF THE INVENTION

The object of the present invention is to provide an image processing apparatus capable of realizing necessary compression techniques for MFPs at low cost, as well as enhancing user-friendliness.

In order to achieve the object, the present invention may provide an image processing apparatus that processes an input image signal, comprising: a compression section that compresses the input image signal to first compression data; a first compression data conversion section that converts the first compression data, which is compressed by the compression section, to second compression data without complete decoding of the first compression data; and a second compression data conversion section that converts the second compression data, which is converted by the first compression data conversion section, to the first compression data without complete decoding of the second compression data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 shows the structure of a Huffman encoding section in the first embodiment;

FIG. 9 shows the structure of a first compression data conversion section;

FIG. 10 shows the structure of a second compression data conversion section;

FIG. 11 is a view for explaining conversion of compression data;

FIG. 17 shows the structure of a Huffman encoding section;

FIG. 27 shows the structure of a print compression section;

FIG. 28 shows the structure of a decoding section;

FIG. 29 shows the structure of a first modification of the fourth embodiment;

FIG. 34 shows the structure of a decoding section; and

FIG. 35 illustrates intra-block data at the time of performing a rotating process.

DETAILED DESCRIPTION OF THE INVENTION

Embodiments of the present invention will now be described with reference to the accompanying drawings.

Figure 1:
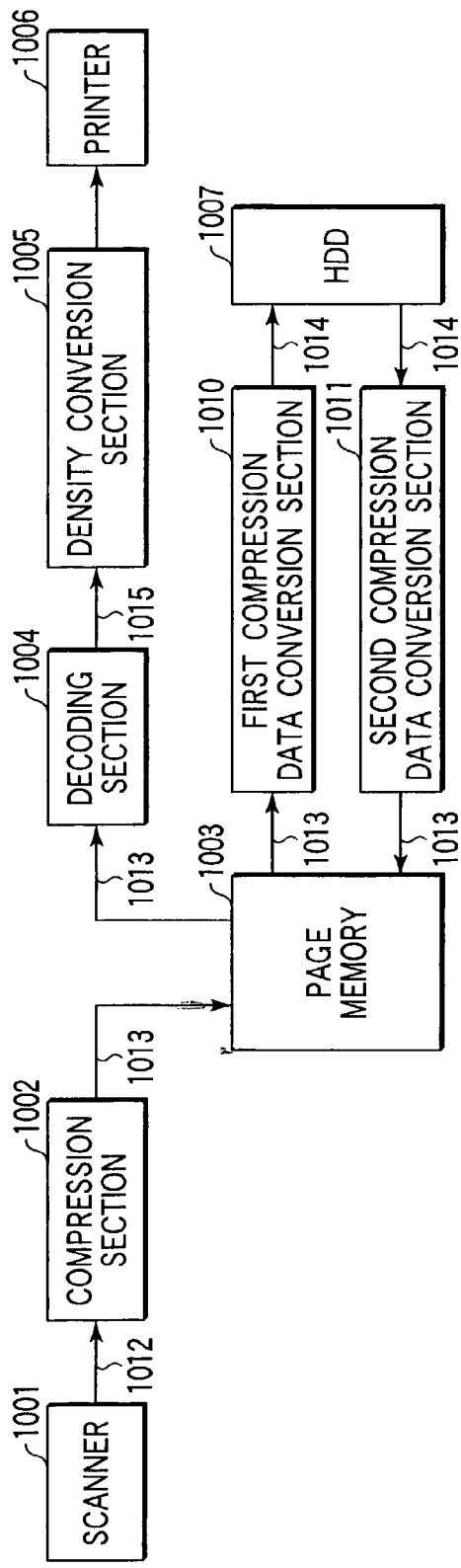
FIG. 1 is a block diagram schematically showing the structure of an MFP according to a first embodiment of an image processing apparatus of the present invention.

FIG. 1 schematically shows the structure of an MFP according to a first embodiment of an image processing apparatus of the present invention. The MFP comprises a scanner 1001 that inputs a black-and-white image signal 1012; a compression section 1002 that compresses the black-and-white image signal to first compression data; a page memory 1003 that stores the first compression data 1013; a decoding section 1004 that decodes the first compression data 1013 to a black-and-white image signal 1015; a density conversion section 1005 that converts the black-and-white image signal 1015 to a density signal; a printer 1006 that prints out the density signal; a first compression data conversion section 1010 that converts the first compression data 1013 stored in the page memory to second compression data 1014; a second compression data conversion section 1011 that converts the second compression data 1014 to the first compression data 1013; and a hard disk drive (HDD) 1007 that stores the second compression data 1014. The MFP includes a control circuit (not shown) that controls the entirety of the apparatus.

In a single-sheet copying mode, the scanner 1001 reads a black-and-white image. The compression section 1002 converts the read black-and-white image signal to first compression data of a fixed length. The page memory 1003 stores the converted first compression data. The first compression data stored in the page memory 1003 is subjected to an editing read-out operation such as a rotational process and then decoded by the decoding section 1004 to a black-and-white signal 1015. The density conversion section 1005 converts the black-and-white image signal 1015 to a density signal through a known density-conversion process. The printer 1006 effects print-out based on the density signal.

In an electronic sorting mode, originals are successively scanned by the scanner 1001. The compression section 1002 compresses the read black-and-white image signals to first compression data, and the first compression data conversion section 1010 converts the first compression data to second compression data. The second compression data is stored in the HDD 1007. The second compression data is successively read out, as required, from the HDD 1007, and converted to the first compression data through the second compression data conversion section 1011. The first compression data is then decoded by the decoding section 1004. The decoded signal is converted to a density signal in the density conversion section 1005, and printed out by the printer 1006.

Next, the compression section 1002 and decoding section 1004 will be described.

Figure 2:
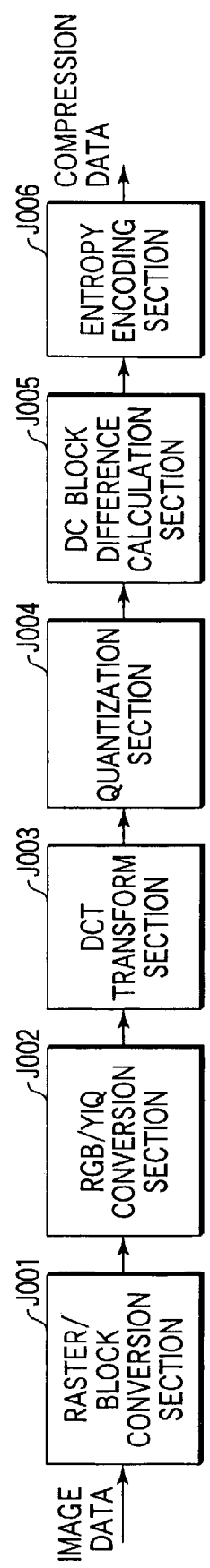
FIG. 2 is a view for describing the structure of JPEG.

FIG. 2 shows the structure of "compression unit" using JPEG (Joint Photograph Expert Group) that is adopted as a standard format of image signals.

The JPEG structure, shown in FIG. 2, for compressing image data to compression data comprises a raster/block conversion section J001, an RGB/YIQ conversion section J002, a DCT transform section J003, a quantization section J004, a DC block difference calculation section J005, and an entropy encoding section J006.

In the JPEG structure for conversing image data to impression data, the raster/block conversion section J001 converts line-unit data to block data of an 8×8 size. The RGB/YIQ conversion section J002 converts RGB image signals of the block data to YIQ image signals. The DCT transform section J003 subjects each of the YIQ image signals to DCT transform in units of a 8×8 block. The quantization section J004 performs a quantization process for DCT coefficients. The DC block difference calculation section J005 calculates a difference between adjacent blocks with respect to only DC components. The entropy (Huffman) encoding section J006 Huffman-encodes a result of 0-run length processing in a range from low frequencies to high frequencies.

The respective processing blocks of the JPEG structure are based on compression techniques focusing on the following characteristics:

The raster/block conversion section: to perform block-unit conversion to permit handling of two-dimensional data with high compression efficiency, thereby to compress an image by frequency conversion.

The RGB/YIQ conversion section: to effect conversion to a luminance/color difference system because human visual characteristics are more sensitive to a difference in brightness than to a difference in color.

The DCT transform section: to convert an image signal to a frequency signal for compression.

The quantization section: to perform quantization so as to more reduce color difference signal data than luminance data, and high-frequency signal data than low-frequency signal data, in consideration of human visual characteristics (i.e. producing more "0" values in a quantization result).

The DC block difference calculation section: to calculate a difference between adjacent blocks by (process block-previous block), making use of the fact that DC components have closer correlations between adjacent blocks (i.e. producing more "0" values).

The entropy encoding section: to perform run-length coding and Huffman coding by arranging frequency components in a range from low frequencies to high frequencies, since there are many high-frequency "0" values.

Figure 3:
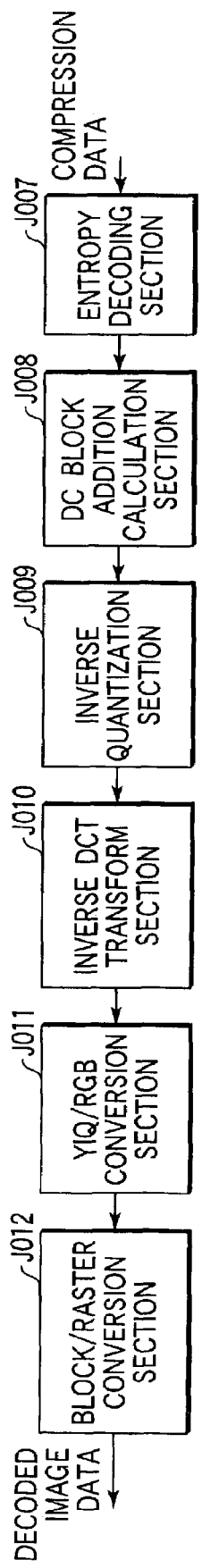
FIG. 3 is a view for describing the structure of JPEG.

In FIG. 3, the JPEG structure for converting the compression data to decoded image data comprises an entropy encoding section J007, a DC block addition calculation section J008, an inverse quantization section J009, an inverse DCT transform section J010, a YIQ/RGB conversion section J011, and a block/raster conversion section J0012.

The decoding of compression data involves inverse conversion of the compression, so a description is omitted here.

The handling of JPEG standard data requires provision of header information as compression information. However, the header information is necessary only when compressed data is transmitted/received as a file. Thus, the header information is not mentioned in this invention, unless such mentioning is required.

FIG. 2 shows the case where color images are treated. Where black-and-white images are treated, the RGB/YIQ conversion and the inverse conversion thereof are needless, and only black-and-white signals need to be converted.

Figure 4:
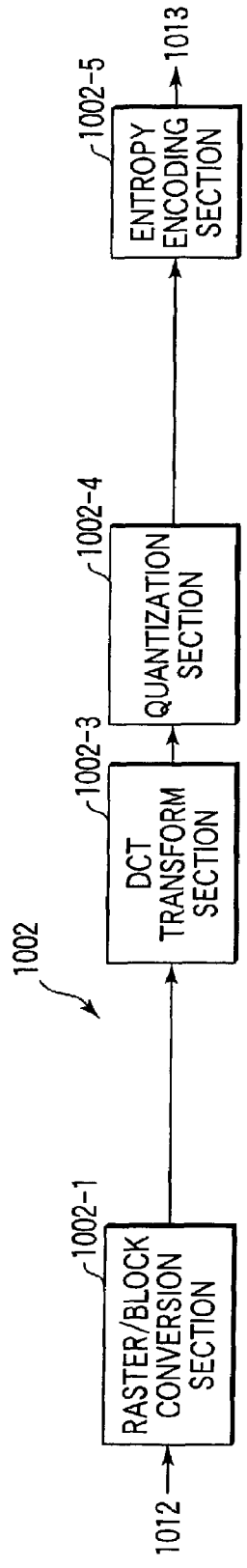
FIG. 4 shows the structure of a compression section.
Figure 5:
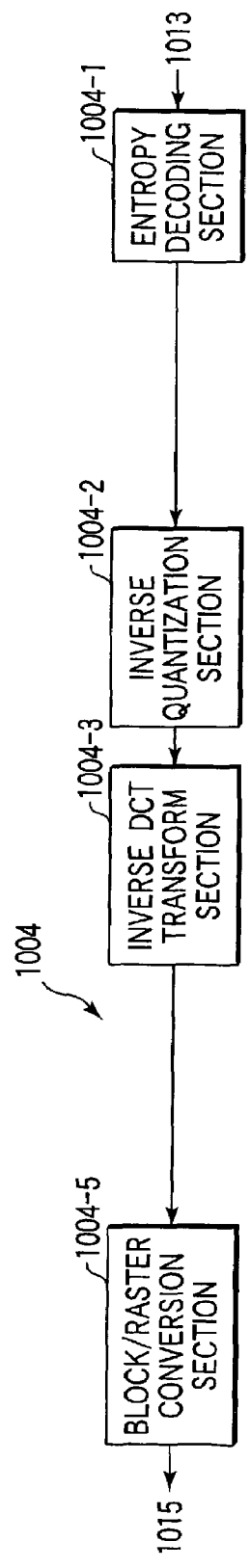
FIG. 5 shows the structure of a decoding section.

FIGS. 4 and 5 show the structures of the compression section 1002 and decoding section 1004.

The compression section 1002 shown in FIG. 4 comprises a raster/block conversion section 1002-1, a DCT transform section 1002-3, a quantization section 1002-4, and an entropy encoding section 1002-5.

Since a black-and-white signal is processed in this example, the RGB/YIQ conversion section J002 and DC block difference calculation section J005 are omitted, and the structure of the entropy encoding section J006 is altered. In the other respects, the structure shown in FIG. 4 is the same as that shown in FIG. 2.

The decoding section 1004 shown in FIG. 5 comprises an entropy decoding section 1004-1, an inverse quantization section 1004-2, an inverse DCT transform section 1004-3, and a block/raster conversion section 1004-5.

Since a black-and-white signal is processed in this example, the YIQ/RGB conversion section J011 and DC block addition calculation section J008 are omitted, and the structure of the entropy decoding section J007 is altered. In the other respects, the structure shown in FIG. 5 is the same as that shown in FIG. 3.

Figure 6:
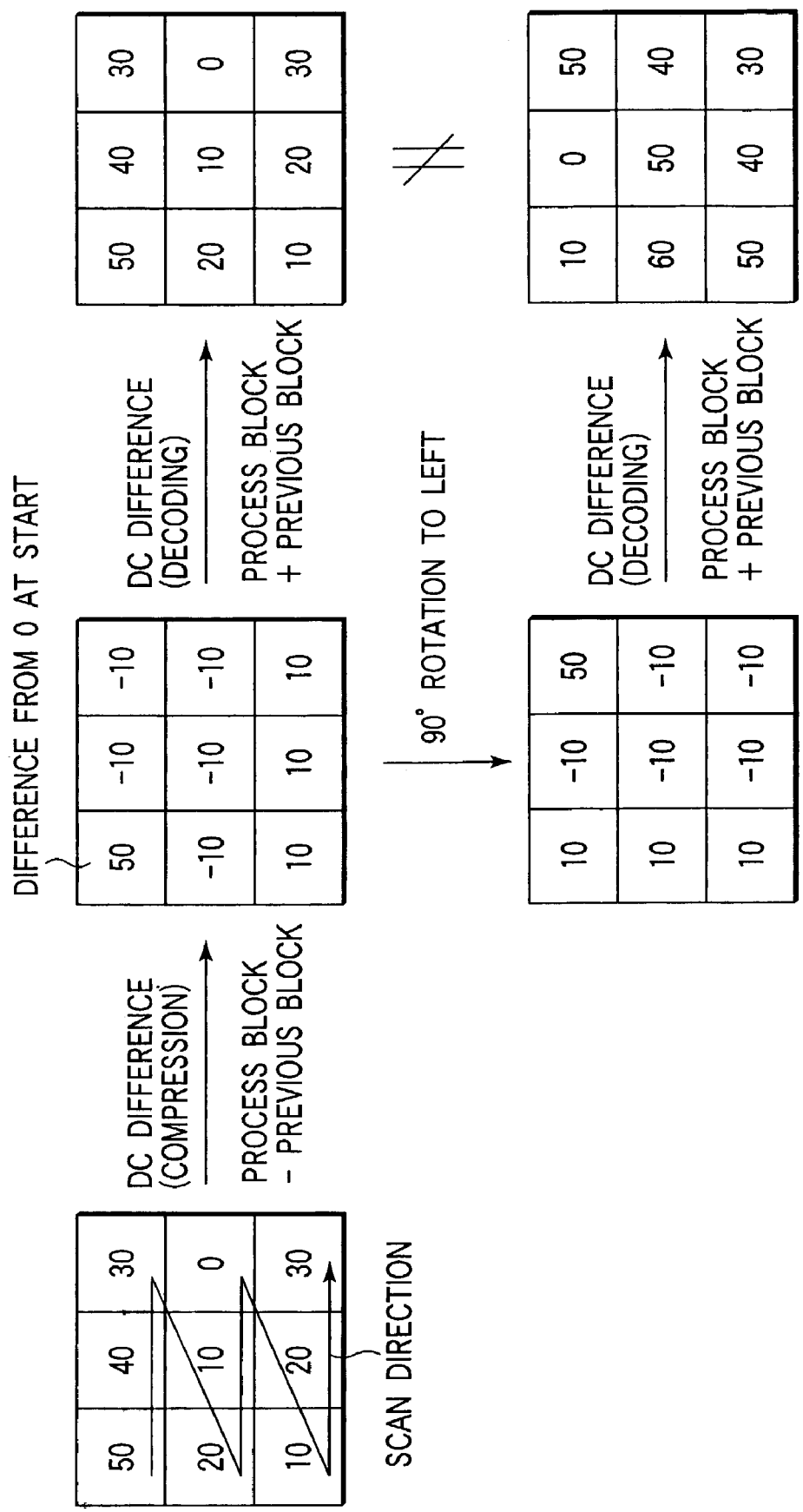
FIG. 6 illustrates a rotating step in an inter-block correlation process.

In the structures shown in FIGS. 4 and 5, the DC block difference calculation section J005, J008 is omitted because correct decoding cannot be executed if a difference calculation is performed at the time of rotating the compression data 1013 as shown in FIG. 6.

Figure 7:
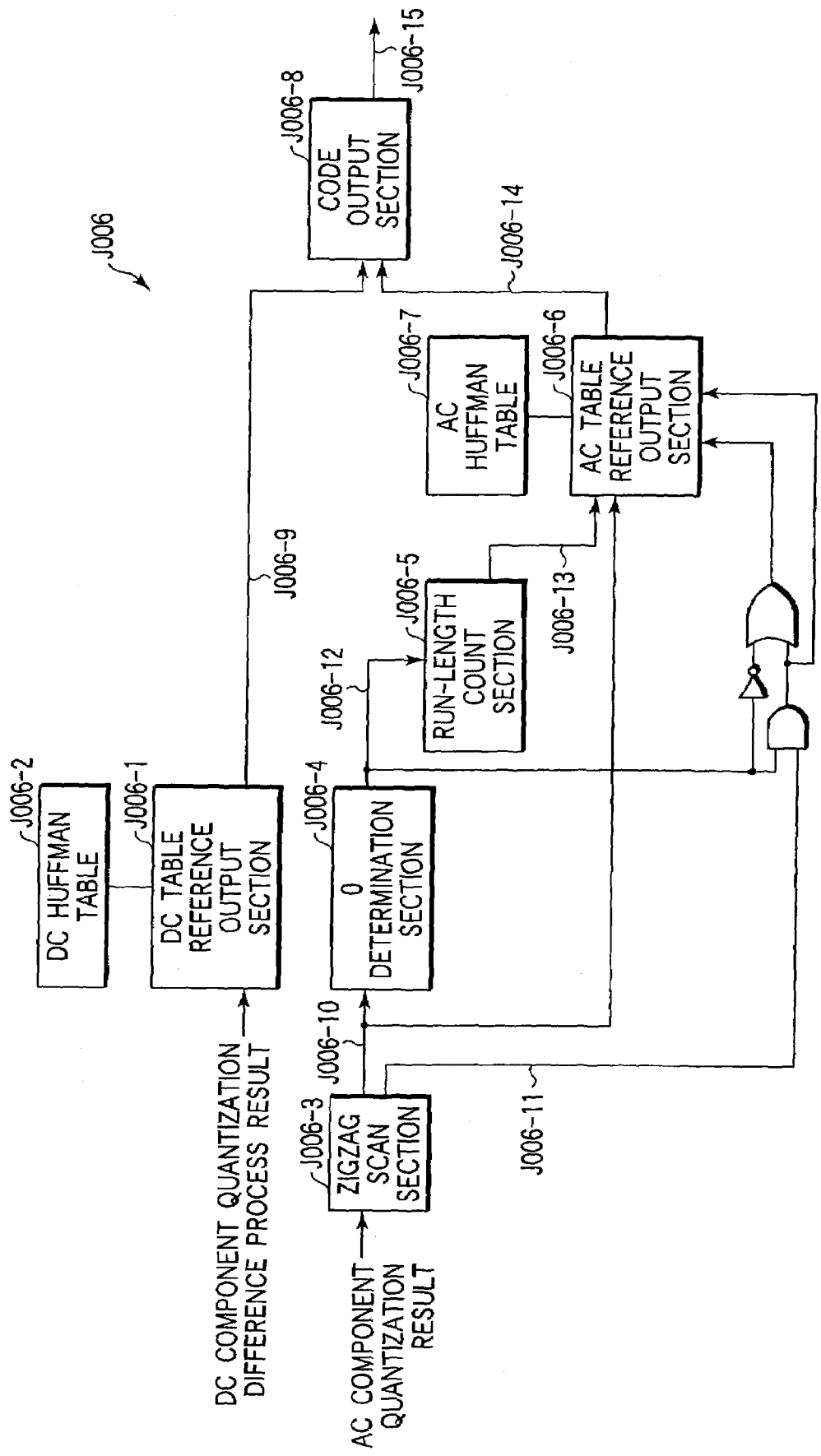
FIG. 7 shows the structure of a Huffman encoding section of JPEG.

FIG. 7 shows the Huffman encoding section J006 of JPEG. Specifically, the DC component is processed in a DC table reference output section J006-1 with reference to a DC Huffman table J006-2, and the difference-processed data is output as a DC component code J006-9.

The AC component is processed in a zigzag scan section J006-3, and the zigzag scan section J006-3 outputs a frequency component J006-10 obtained by successive zigzag scan in a range from low frequencies to high frequencies, and a scan terminal signal J006-11 indicative of whether one block scan is finished (=1) or not.

A 0-determination section J006-4 determines whether the frequency component J006-10 is "0 (=1)" or "non-0", and produces a determination signal J006-12.

A run-length count section J006-5 counts 0-runs.

An AC table reference output section J006-6 outputs the 0-run length and non-0 value as an AC component code J006-14 by referring to an AC Huffman table J006-7.

The AC table coding is effected at the following timings:
(1) At the time of non-0 data, and
(2) At the time of a frequency terminal end.

In case (1), coding is effected by combining "non-0" and a 0-run length before "non-0". However, if the run length is 16 or more, expression is made by plural ZRL codes (a multiple of 16 of run-length) and a code of "non-0" and the remaining run-length.

In case (2), coding is effected according to the rule of (1) in the case of "non-0". In the case of "0", coding is effected using an EOB code that indicates that "0" continues until the terminal end of the block.

At the time of coding, the run-length count section J006-5 is reset at "0".

A code output section J006-8 combines the DC component code J006-9 and the AC component code J006-14 in units of a block and produces code data J006-15.

FIG. 8 shows the Huffman encoding section 1002-5 of the present invention. The Huffman encoding section 1002-5 comprises a DC table reference output section 1002-5-01, a DC Huffman table 1002-5-02, a zigzag scan section 1002-5-03, a 0-determination section 1002-5-04, a run-length count section 1002-5-05, an AC table reference output section 1002-5-06, an AC Huffman table 1002-5-07, a code output section 1002-5-08, and a code length determination section 1002-5-15.

This structure is obtained by adding the following components to the structure of the JPEG Huffman encoding section J006 shown in FIG. 7: the code length determination section 1002-5-15 that determines whether the code amount in a block is within a threshold or not, on the basis of a DC component code 1002-5-09 and an AC component code 1002-5-14, and a code length determination signal 1002-5-16.

In addition, this structure is the same as the structure of the JPEG entropy encoding section J006 shown in FIG. 7, except that the signal 1002-5-16 is input to the AC table reference output section 1002-5-06 and the code output section 1002-5-08 operates differently.

If the DC component and AC component exceed an encoding threshold, the code length determination section 1002-5-15 outputs "1". When the code length determination signal 1002-5-16 is "1", the AC table reference output section 1002-5-06 forcibly converts the currently processed code to an EOB code, finishes the encoding of the block, and begins processing of the next block.

The code output section 1002-5-08 stores a code in a predetermined memory format that is 0-cleared, and a specific code "1" is added to the end of the code. This is the difference.

The Huffman decoding section J007, 1004-1 performs the inverse operation of the Huffman encoding section, so a description thereof is omitted.

For the fixed-length data decoding, the Huffman decoding section 1004-1 finishes decoding in units of a block and then begins a read-out process from a top address of the next block. As a result, the specific code is ignored in the decoding process and it does not affect a decoded image.

At the time of a rotational process, rotational read-out of the first compression data 1013 is effected from the page memory 1003 in units of a block. The read-out data is subjected to an intra-block rotational process in the block/raster conversion section 1004-5 of decoding section 1004, and it is decoded as a rotational image.

FIG. 9 shows the structure of the first compression data conversion section 1010. The first compression data conversion section 1010 comprises a block boundary extraction section 1010-1, a specific code extraction section 1010-2, and a marker insertion section 1010-3.

The block boundary extraction section 1010-1 extracts a code boundary of a block in the first compression data 1013. Since the first compression data 1013 is compressed with the same code length for each block, the block boundary can be extracted with a simple address calculation.

The specific code extraction section 1010-2 performs a forward scan from the rear end of the code boundary of the block and extracts the specific code "1". The extraction of the specific code is easy, since the rear end portion of the block is filled with all "0"s until the specific code appears.

The marker insertion section 1010-3 inserts a marker, which is used as header information of JPEG, after the specific code, and outputs the data up to the rear end of the marker as second compression data 1014. According to JPEG, the marker is, as a rule, inserted at the byte boundary. If the marker terminal end is not the byte boundary, "0" is inserted between the specific code and the marker so that the marker terminal end may coincide with the byte boundary.

FIG. 10 shows the structure of the second compression data conversion section 1011. The second compression data conversion section 1011 comprises a marker extraction section 1011-1 and a marker removal section 1011-2. The second compression data conversion section 1011 performs the inverse operation of the first compression data conversion section 1010.

Specifically, the marker extraction section 1011-1 extracts the marker from the second compression data 1014, and the marker removal section 1011-2 removes the marker. Thereby, the second compression data conversion section 1011 inserts "0" after the specific code "1" within the predetermined code length and converts the second compression data to the first compression data 1013 and outputs the result.

FIG. 11 illustrates the above-described conversion of the first compression data and second compression data.

The first compression data, as shown in portion (a) of FIG. 11, is always output as data with a predetermined code length (20 bytes in this example) in units of a block.

The second compression data, as shown in portion (b), is formed such that the marker is inserted at the terminal end of the specific code.

According the above rules, mutual conversion between (a) and (b) [(a)⇔(b)] is achieved.

In general, image data contains a large uniform data area of, e.g. white, and a small amount of effective code data. Thus, even if fixed-length processing is performed, a large mount of code adjustment data is included, as shown in the former part of portion (a) of FIG. 11.

If the image is viewed as a whole, the relationship, (a)>(b), is recognized. According to the present invention, the editing process such as rotation can be performed by using the first compression data 1013 without repeating compression/decompression processes. The second compression data 1014 has a high compression ratio, the amount of storage in the HDD is large, and electronic sorting with a high transfer speed can be realized.

In the first embodiment, the black-and-white signal is handled by way of example. Even where a color signal is handled, only the number of associated signals differs and the improvement by the same conversion is realized.

Besides, in the first embodiment, JPEG is treated as a basic compression technique. The compression technique is not limited to this, if sequential conversion of frequencies, etc. is performed in units of a block, and entropy encoding such as Huffman encoding is carried out.

A first modification of the first embodiment will now be described.

Figure 12:
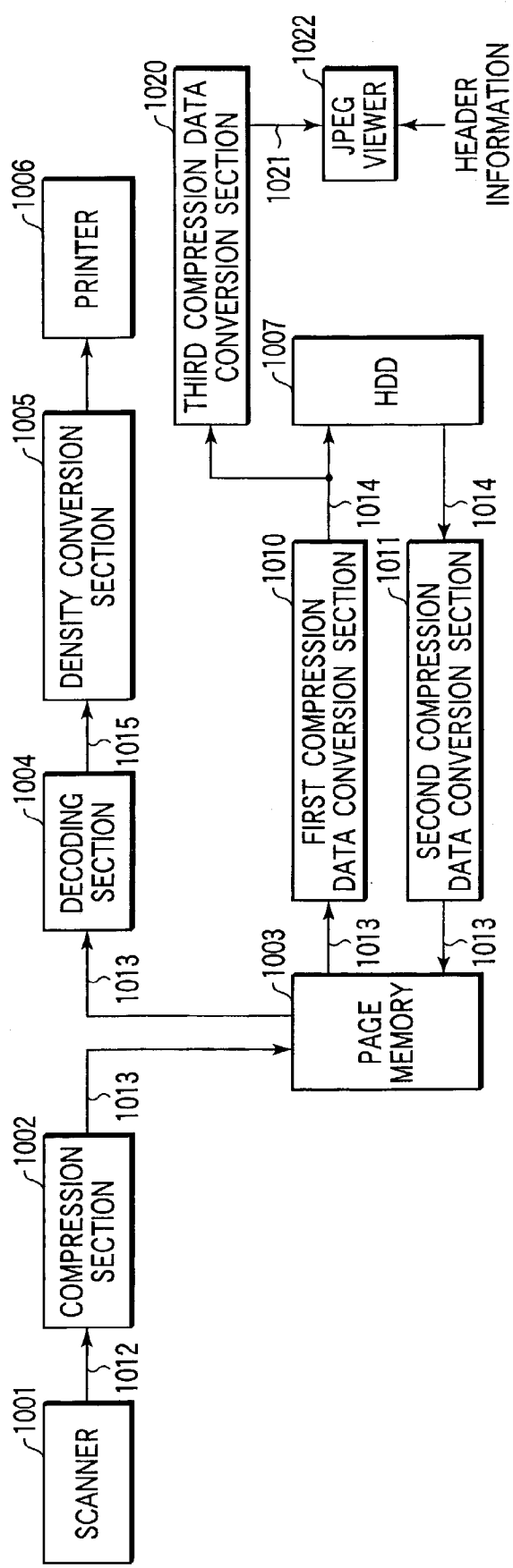
FIG. 12 shows the structure of a first modification of the first embodiment.

FIG. 12 shows the structure of a first modification of the first embodiment.

The first modification differs from the first embodiment in that the second compression data 1014 is input to the HDD 1007 and a third compression data conversion section 1020, and third compression data 1021 is input to a JPEG viewer 1022.

Figure 13:
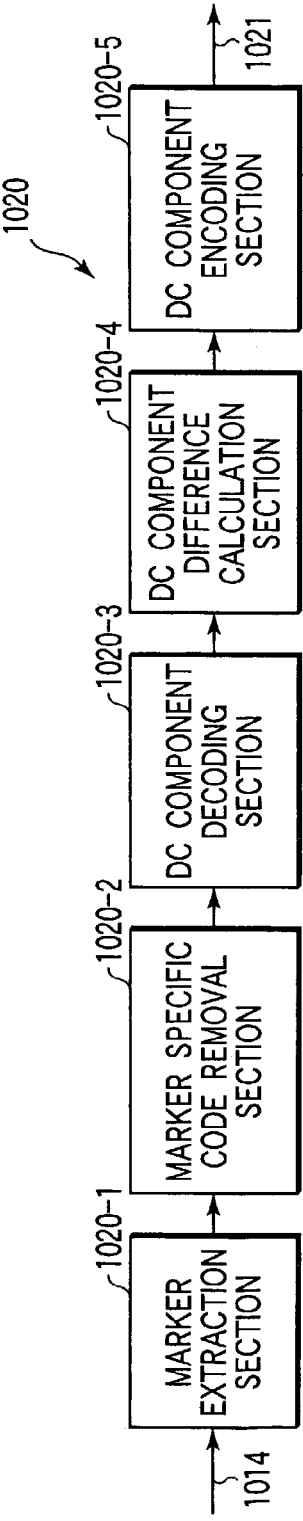
FIG. 13 shows the structure of a third compression data conversion section.

FIG. 13 shows the structure of the third compression data conversion section 1020. The third compression data conversion section 1020 comprises a marker extraction section 1020-1, a marker specific code removal section 1020-2, a DC component decoding section 1020-3, a DC component difference calculation section 1020-4 and a DC component encoding section 1020-5.

The marker extraction section 1020-1 extracts the marker, as in the first embodiment, and the marker specific code removal section 1020-2 removes the marker, specific code and adjustment code between the marker and specific code.

The DC component decoding section 1020-3 Huffman-decodes only the DC component. The DC component difference calculation section 1020-4 calculates a DC difference between adjacent blocks.

The DC component encoding section 1020-5 subjects the DC component to re-Huffman encoding, and outputs the result as third compression data 1021.

The JPEG viewer 1022 decodes and displays compression data based on the third compression data 1021 and the header information from the control circuit (not shown).

The second compression data 1014 is the same as JPEG standard data, except for the non-DC difference process, specific code and marker. Thus, the second compression data 1014 can be displayed on the JPEG viewer 1022 with the above-described structure.

As has been described above, according to the first modification of the first embodiment, the editing of image compression data with a fixed length is realized for copying use. The HDD productivity with a variable length is enhanced, and the data can be viewed on an ordinary external viewer with simple conversion.

In the above-described first modification, the second compression data is converted to the third compression data. Needless to say, alternatively, the first compression data can be converted to the third compression data.

A second modification of the first embodiment will now be described.

Figure 14:
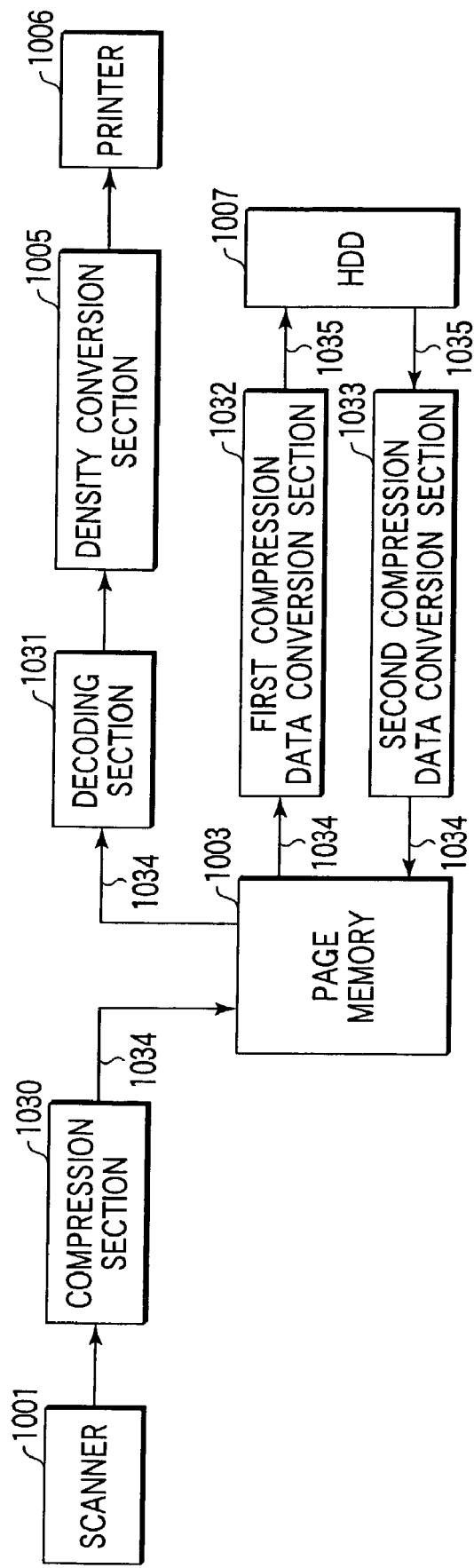
FIG. 14 shows the structure of a second modification of the first embodiment.

FIG. 14 shows the structure of the second modification of the first embodiment.

The basic structure is the same as the first embodiment except for the first compression data 1034 generated by the compression section 1030 and the second compression data 1035 converted from the first compression data 1034.

Thus, the second modification is the same as the first embodiment except that the decoding section 1031 for decoding the first compression data 1034 and the first and second compression data conversion sections 1032 and 1033 for mutually converting the second compression data 1035 are different accordingly.

Figure 15:
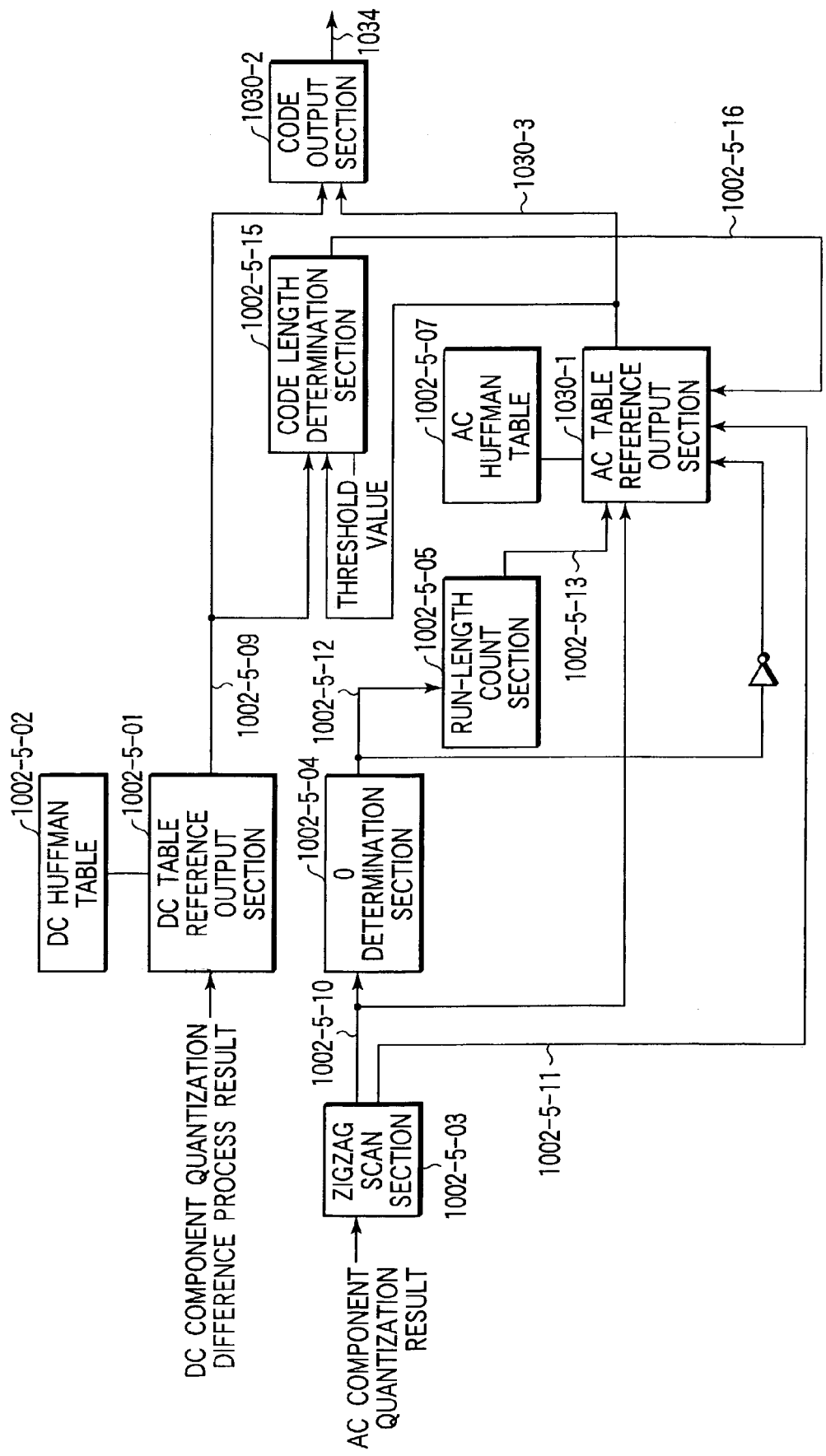
FIG. 15 shows the structure of a Huffman encoding section.

FIG. 15 shows the structure of the entropy encoding section 1002-5 of the compression section 1030.

The structure of the Huffman encoding section 1002-5 shown in FIG. 15 is basically the same as that of the first embodiment shown in FIG. 8, except for the AC table reference output section 1030-1, AC table reference result 1030-3 and code output section 1030-2.

Unlike the first embodiment, the AC table reference output section 1030-1 outputs a code under the following conditions. In short, an EOB code is always output at the terminal end of the AC component.

(1) At the time of "non-0", and not at the terminal end.

(2) The EOB code is output at the time of the terminal end, irrespective of whether the terminal end is "0" or "non-0".

The code output section 1030-2 merely stores the code in a predetermined memory format that is 0-cleared, and does not add the specific code "1".

The first compression data conversion section 1032 and second compression data conversion section 1033 are the same as in the first embodiment, except that the EOB code, in lieu of the code "1", is searched for.

Figure 16:
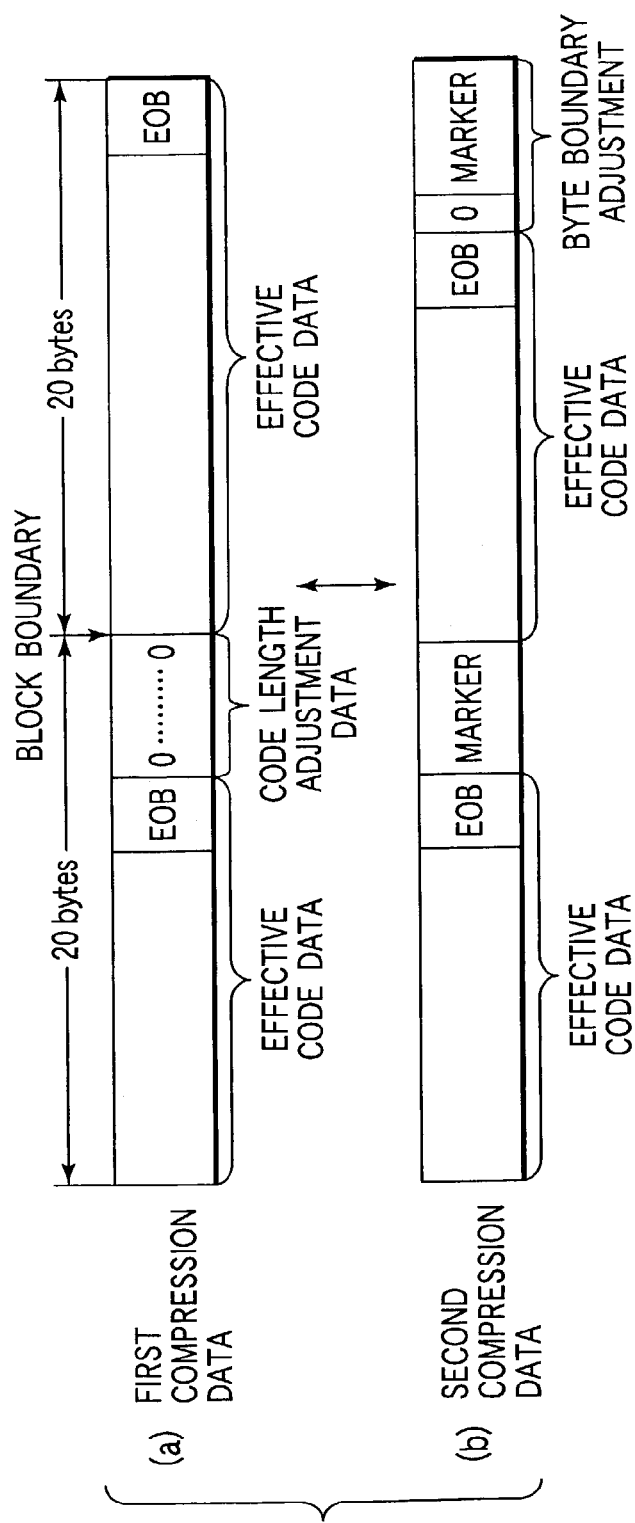
FIG. 16 is a view for explaining conversion.

FIG. 16 illustrates the conversion in this case.

In general, an image contains less useful information in high-frequency components. Thus, it is highly probable that the AC component terminal end is encoded with "0", that is, the EOB code. By performing compression so as to produce the EOB code without fail, the EOB code can be used as the specific code and the loss corresponding to the specific code can be reduced.

The image processing apparatus of the first embodiment has the following structures.

That is, there is provided an image processing apparatus comprising: a compression section that compresses an image signal to first compression data; a first compression data conversion section that converts the first compression data, which is compressed by the compression section, to second compression data without complete decoding of the first compression data; and a second compression data conversion section that converts the second compression data, which is converted by the first compression data conversion section, to the first compression data without complete decoding of the second compression data. In this apparatus, a code amount of the first compression data differs from a code amount of the second compression data.

There is provided an image processing apparatus including a compression section that compresses an image signal to first compression data; a first compression data conversion section that converts the first compression data, which is compressed by the compression section, to second compression data without complete decoding of the first compression data; and a second compression data conversion section that converts the second compression data, which is converted by the first compression data conversion section, to the first compression data without complete decoding of the second compression data, wherein the first compression data is fixed-length code data, and the second compression data is variable-length code data having a code amount equal to or less than a code amount of the first compression data.

There is provided an image processing apparatus including a compression section that compresses an image signal to first compression data using a sequential conversion and an entropy encoding; a first compression data conversion section that converts the first compression data, which is compressed by the compression section, to second compression data without complete decoding of the first compression data; and a second compression data conversion section that converts the second compression data, which is converted by the first compression data conversion section, to the first compression data without complete decoding of the second compression data. In this apparatus, the compression section, in entropy encoding, provides an effective code marker at a terminal end of an effective code in units of a block, and compresses the first compression data to a predetermined code length in units of a block by using an effective code, an effective marker and an invalid code. The first compression data conversion section includes a first boundary search section that performs a pattern matching for the first compression data and searches for an effective code boundary of each block, and a boundary marker insertion section that removes the invalid code and inserts a block boundary marker. The second compression data conversion section includes a second boundary search section that performs a pattern matching for the second compression data and searches for the block boundary marker, a code length determination section that determines whether a total code length of the effective code and the effective code marker is shorter than a predetermined code length, and an invalid code insertion section that inserts the invalid code when it is determined that the code length excluding the block boundary marker is shorter, whereby the second compression data conversion section converts the second compression data to the first compression data.

There is provided an image processing apparatus including a compression section that compresses an image signal to first compression data using a sequential conversion and an entropy encoding; a first compression data conversion section that converts the first compression data, which is compressed by the compression section, to second compression data without complete decoding of the first compression data; and a second compression data conversion section that converts the second compression data, which is converted by the first compression data conversion section, to the first compression data without complete decoding of the second compression data. In this apparatus, the compression section, in entropy encoding, provides an effective code marker at a terminal end of an effective code in units of a block, and compresses the first compression data to a predetermined code length in units of a block by using an effective code, an effective marker and an invalid code. The first compression data conversion section includes a first boundary search section that performs a pattern matching for the first compression data and searches for an effective code boundary of each block, and a boundary marker insertion section that removes the invalid code and inserts a block boundary marker. The second compression data conversion section includes a second boundary search section that performs a pattern matching for the second compression data and searches for the block boundary marker, a code length determination section that determines whether a total code length of the effective code and the effective code marker is shorter than a predetermined code length, and an invalid code insertion section that inserts the invalid code when it is determined that the code length excluding the block boundary marker is shorter, whereby the second compression data conversion section converts the second compression data to the first compression data. The third compression data conversion section has a third boundary search section that performs a pattern matching for the second compression data and searches for a block boundary marker, and a marker removal section that removes the block boundary marker and an effective code marker.

There is provided an image processing apparatus including a compression section that compresses an image signal to first compression data using a sequential conversion and an entropy encoding that uses a run-length in order of priority of an intra-block sequential conversion result and inserts a terminal end marker, which indicates continuity of data up to a terminal end, in place of the run-length, when data continues up to the terminal end; a first compression data conversion section that converts the first compression data, which is compressed by the compression section, to second compression data without complete decoding of the first compression data; a second compression data conversion section that converts the second compression data, which is converted by the first compression data conversion section, to the first compression data without complete decoding of the second compression data; and a third compression data conversion section that converts the second compression data, which is converted by the first compression data conversion section, to third compression data without complete decoding of the second compression data. In this apparatus, the compression section includes a sequence correction section that corrects a terminal end sequential conversion result such that the terminal end marker always occurs in the entropy encoding, and compresses the first compression data to a predetermined code length in units of a block using an effective code, the terminal end marker and an invalid code. The first compression data conversion section includes a first boundary search section that performs a pattern matching for the first compression data and searches for an effective code boundary of each block, and a boundary marker insertion section that removes the invalid code and inserts a block boundary marker. The second compression data conversion section includes a second boundary search section that performs a pattern matching for the second compression data and searches for the block boundary marker, a code length determination section that determines whether a total code length of the effective code and the effective code marker is shorter than a predetermined code length, and an invalid code insertion section that inserts the invalid code when it is determined that the code length excluding the block boundary marker is shorter. The third compression data conversion section has a third boundary search section that performs a pattern matching for the second compression data and searches for a block boundary marker, and a marker removal section that removes the block boundary marker and an effective code marker.

A second embodiment of the present invention will now be described.

An MFP according to the second embodiment is provided with a JPEG viewer (not shown) in addition to the structure of the first embodiment shown in FIG. 1. The JPEG viewer may be an ordinary one, and it interprets header information and displays a JPEG-compressed image.

The second embodiment is the same as the first embodiment except for a compression section 2002, a decoding section 2004, a first compression data conversion section 2010, a second compression data conversion section 2011, and generated first and second compression data 2013, 2014.

The compression section 2002 has the same structure as the compression section 1002 of the first embodiment shown in FIG. 4. The structure of the compression section 2002 is not shown since it is the same as the first embodiment. The compression section 2002 comprises a raster/block conversion section 2002-1, a DCT transform section 2002-3, a quantization section 2002-4 and an entropy encoding section 2002-5.

FIG. 17 shows the structure of the Huffman encoding section 2002-5 in the compression section 2002. The Huffman encoding section 2002-5 comprises a DC table reference output section 2002-5-01, a DC Huffman table 2002-5-02, a zigzag scan section 2002-5-03, a 0-determination section 2002-5-04, a run-length count section 2002-5-05, an AC table reference output section 2002-5-06, an AC Huffman table 2002-5-07, a code output section 2002-5-08, and a code length determination section 2002-5-15.

The above structure is the same as the first embodiment except for the code output section 2002-5-08. The code output section 2002-5-08 merely stores the code in a predetermined memory format that is 0-cleared, and does not add the specific code "1". The AC table coding is effected at the time of "non-0" and at the time of a terminal end, and a code is output.

Figure 18:
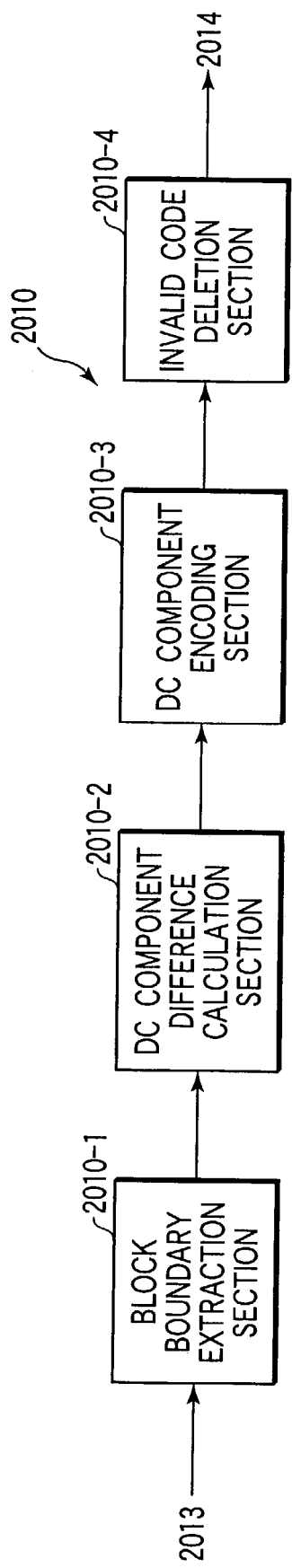
FIG. 18 shows the structure of a first compression data conversion section.

FIG. 18 shows the structure of the first compression data conversion section 2010. The first compression data conversion section 2010 comprises a block boundary extraction section 2010-1, a DC component difference calculation section 2010-2, a DC component encoding section 2010-3, and an invalid code deletion section 2010-4.

The block boundary extraction section 2010-1 entropy-decodes the DC component and AC component and searches for the code at the frequency component terminal end. After the search, a predetermined address is incremented and taken out in order to access data of the next block. In the search process, a search for the block boundary is carried out by successively executing Huffman decoding and counting the number of components (64 components). As has been described in connection with FIG. 17, there is no need to add the specific code indicative of the block boundary.

Subsequently, the DC component difference calculation section 2010-2 calculates a DC difference from the previous block and finds a correlation with the adjacent pixel. The DC component encoding section 2010-3 performs Huffman encoding. The invalid code deletion section 2010-4 fills the encoded result of the encoded DC component and AC component into the encoded result of the previous block without space, thus generating the second compression data 2014.

Figure 19:
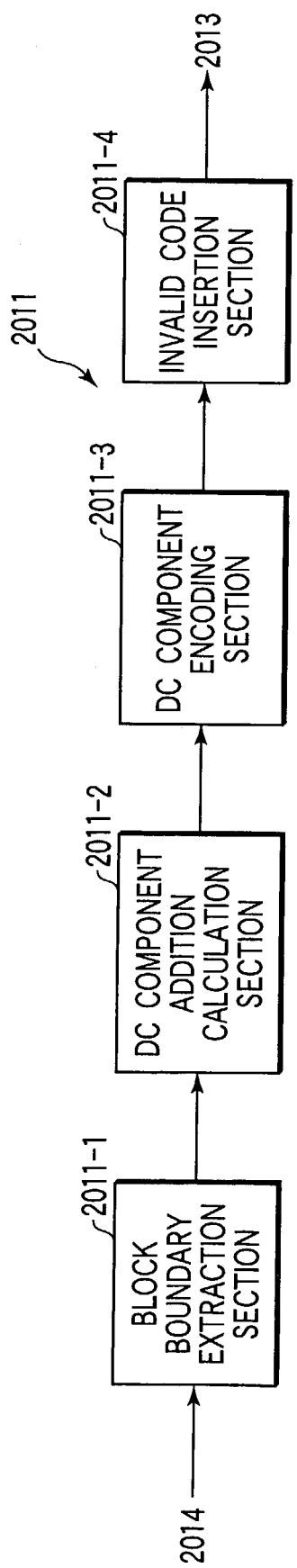
FIG. 19 shows the structure of a second compression data conversion section.

FIG. 19 shows the structure of the second compression data conversion section 2011. The second compression data conversion section 2011 comprises a block boundary extraction section 2011-1, a DC component addition calculation section 2011-2, a DC component encoding section 2011-3, and an invalid code insertion section 2011-4.

The second compression data conversion section 2011 performs the inverse conversion of the first compression data conversion section 2010. As is shown in FIG. 19, the block boundary extraction section 2011-1 searches for a boundary by Huffman decoding. The DC component addition calculation section 2011-2 eliminates the correlation with the adjacent block. The DC component encoding section 2011-3 performs re-entropy encoding. The invalid code insertion section 2011-4 inserts the DC and AC encoded result in the predetermined memory that is 0-cleared, and outputs the result as the first compression data 2013.

As has been described above, according to the second embodiment, the entropy decoding is used for the block boundary search that is necessary for mutual conversion of the first and second compression data. Thereby, it is not necessary to add a non-effective code. Thus, without decreasing the encoding efficiency, mutual conversion of compression data of different requests can be performed with simple construction without complete decoding.

At the time of mutual conversion, the presence/absence of the use of correlation between adjacent pixels is also converted. Thus, editing such as rotation is easy for the first compression data, and the second compression data can be converted to data with a high compression performance.

The second compression data conforms to the JPEG format. Thus, if header information is provided to the JPEG viewer (not shown), it can be viewed without re-conversion.

A first modification of the second embodiment will now be described.

Figure 20:
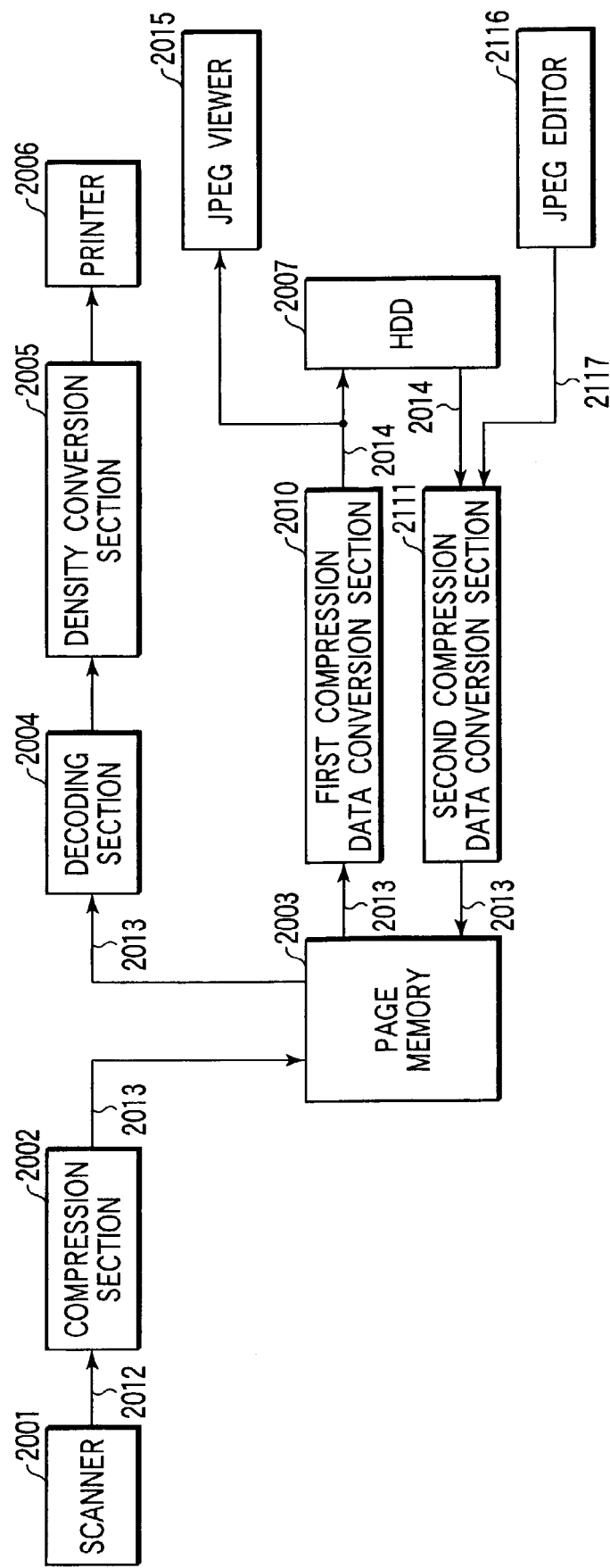
FIG. 20 shows the structure of a first modification of a second embodiment.

FIG. 20 shows the structure of the first modification of the second embodiment.

The first modification of the second embodiment is the same as the second embodiment except that a second compression data conversion section 2111 is different and a JPEG editor 2116 and third compression data 2117 of the JPEG editor 2116 are added. In this modification, a JPEG viewer 2015 is shown.

The JPEG editor 2116 is a general JPEG compression application and outputs the compression data 2117 without header information.

Figure 21:
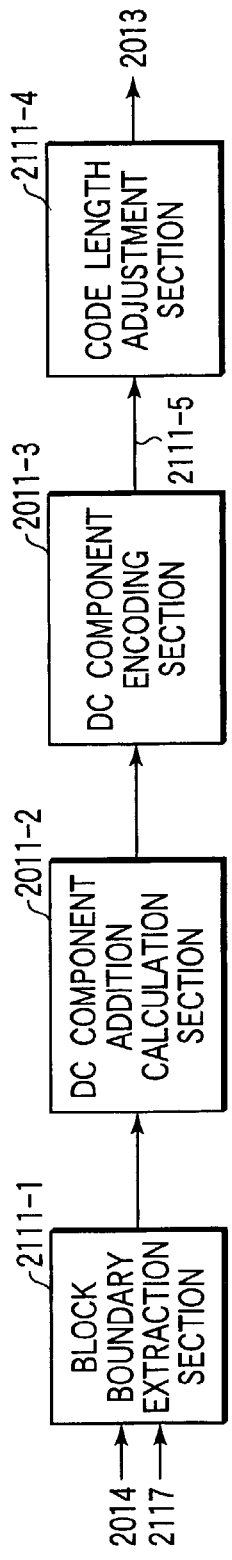
FIG. 21 shows the structure of a second compression data conversion section.

FIG. 21 shows the structure of the second compression data conversion section 2111. The second compression data conversion section 2111 comprises a block boundary extraction section 2111-1, a DC component addition calculation section 2111-2, a DC component encoding section 2111-3, and a code length adjustment section 2111-4.

The second compression data conversion section 2111, as shown in FIG. 21, receives the second compression data 2014 and third compression data 2117. The DC component addition calculation section 2011-2 and DC component encoding section 2011-3 are the same as those in the second embodiment.

The code length adjustment section 2111-4 executes AC component inverse conversion, AC component code length adjustment and AC component entropy re-encoding only when the code length per block exceeds a predetermined code length. In the AC component code length adjustment, like the entropy encoding in the compression section 2002, the value of the high-frequency component is forcibly set at 0 to effect adjustment.

The Huffman table and quantization table necessary for the second compression data conversion section 2111 and decoding section 2004 are supplied from the JPEG editor 2116, like the header information delivered to the JPEG viewer 2015. They are set as parameters in the necessary processing blocks.

As has been described above, according to the first modification of the second embodiment, the second compression data conversion section 2111 includes the code length adjustment section. Thus, the compression data generated within the system can easily be viewed on the outside. Furthermore, compression data from the outside, like the internally generated compression data, can be subjected to editing, such as rotation, and printing.

The image processing apparatus of the second embodiment has the following structures.

That is, there is provided an image processing apparatus including a compression section that compresses an image signal to first compression data using a sequential conversion and an entropy encoding; a first compression data conversion section that converts the first compression data, which is compressed by the compression section, to second compression data without complete decoding of the first compression data; and a second compression data conversion section that converts the second compression data, which is converted by the first compression data conversion section, to the first compression data without complete decoding of the second compression data. In this apparatus, the compression section, in the entropy encoding, compresses the first compression data to a predetermined code length in units of a block using an effective code and an invalid code in units of a block. The first compression data conversion section includes a first boundary search section that performs an entropy decoding for the first compression data and searches for an effective code boundary of each block, and an invalid code deletion section that removes the invalid code. The second compression data conversion section includes a second boundary search section that performs an entropy decoding for the second compression data and searches for the effective code boundary of each block, a code length determination section that determines whether an effective code length is shorter than a predetermined code length, and an invalid code insertion section that inserts the invalid code at the effective code boundary when it is determined that the code length is shorter.

There is also provided an image processing apparatus including a compression section that compresses an image signal to first compression data using a sequential conversion and an entropy encoding; a first compression data conversion section that converts the first compression data, which is compressed by the compression section, to second compression data without complete decoding of the first compression data; and a second compression data conversion section that converts the second compression data, which is converted by the first compression data conversion section, to the first compression data without complete decoding of the second compression data. In this apparatus, the compression section includes a first memory clear section that inserts the invalid code in a predetermined code length memory area in units of a block in the entropy encoding, and a first memory write section that writes the effective code in the memory area by adjusting the code amount of the effective code such that the effective code has a predetermined code length or less in units of a block, whereby the compression section compresses the first compression data to a predetermined code length in units of a block. The first compression data conversion section includes a first boundary search section that performs an entropy decoding for the first compression data and searches for an effective code boundary of each block, and an invalid code deletion section that removes the invalid code. The second compression data conversion section includes a second boundary search section that performs an entropy decoding for the second compression data and searches for the effective code boundary of each block, a second memory clear section that inserts the invalid code in a predetermined code length memory area, and a second memory write section that extracts the effective code of the block and writes the effective code in the memory area, whereby the second compression data conversion section converts the second compression data to the first compression data.

There is also provided an image processing apparatus including a first compression section that compresses an image signal to first compression data using a sequential conversion and an entropy encoding; a first compression data conversion section that converts the first compression data, which is converted by the first compression section, to second compression data without complete decoding of the first compression data; a second compression data conversion section that converts the second compression data, which is converted by the first compression data conversion section, to the first compression data without complete decoding of the second compression data; and a second compression section that compresses and decodes the second compression data. In this apparatus, the first compression section, in the entropy encoding, compresses the first compression data to a predetermined code length in units of a block using an effective code and an invalid code in units of a block. The first compression data conversion section includes a first boundary search section that performs an entropy decoding for the first compression data and searches for an effective code boundary of each block, and an invalid code deletion section that removes the invalid code. The second compression data conversion section includes a second boundary search section that performs an entropy decoding for the second compression data and searches for the effective code boundary of each block, a code length determination section that determines whether an effective code length is longer or shorter than a predetermined code length, a code length adjustment section that alters the code length to the predetermined code length when the code length is determined to be longer, and an invalid code insertion section that inserts the invalid code at the effective code boundary when the code length is determined to be shorter.

Further, there is provided an image processing apparatus including a compression section that compresses an image signal to first compression data in units of a block; a first compression data conversion section that converts the first compression data, which is compressed by the compression section, to second compression data without complete decoding of the first compression data; and a second compression data conversion section that converts the second compression data, which is converted by the first compression data conversion section, to the first compression data without complete decoding of the second compression data.

In this apparatus, the first compression data is independent as a block, and the second compression data is data compressed using a correlation with another block.

There is also provided an image processing apparatus including a first compression section that compresses an image signal to first compression data using a sequential conversion and an entropy encoding in units of a block; a first compression data conversion section that converts the first compression data, which is converted by the first compression section, to second compression data without complete decoding of the first compression data; a second compression data conversion section that converts the second compression data, which is converted by the first compression data conversion section, to the first compression data without complete decoding of the second compression data; and a second compression section that compresses and decodes the second compression data. In this apparatus, the first compression section, in the entropy encoding, compresses the first compression data to a predetermined code length in a block-independent manner using an effective code and an invalid code in units of a block. The first compression data conversion section includes a first boundary search section that performs an entropy decoding for the first compression data and searches for an effective code boundary of each block, an invalid code deletion section that removes the invalid code, a decoding extraction section that extracts only an entropy decoding result of a specific sequence, a difference calculation section that calculates a difference of the specific entropy decoding result from an adjacent block, an entropy encoding section that entropy-encodes the difference result, a sequence decoding section that sequence-decodes only the entropy encoding result, a difference calculation section that calculates a difference of the specific decoding sequence from the adjacent block, and the difference result. The second compression data conversion section includes a second boundary search section that performs an entropy decoding for the second compression data and searches for the effective code boundary of each block, a code length determination section that determines whether an effective code length is longer or shorter than a predetermined code length, a code length adjustment section that alters the code length to the predetermined code length when the code length is determined to be longer, and an invalid code insertion section that inserts the invalid code at the effective code boundary when the code length is determined to be shorter. Thus, the second compression data conversion section converts the second compression data to the first compression data.

A third embodiment of the present invention will now be described.

Figure 22:
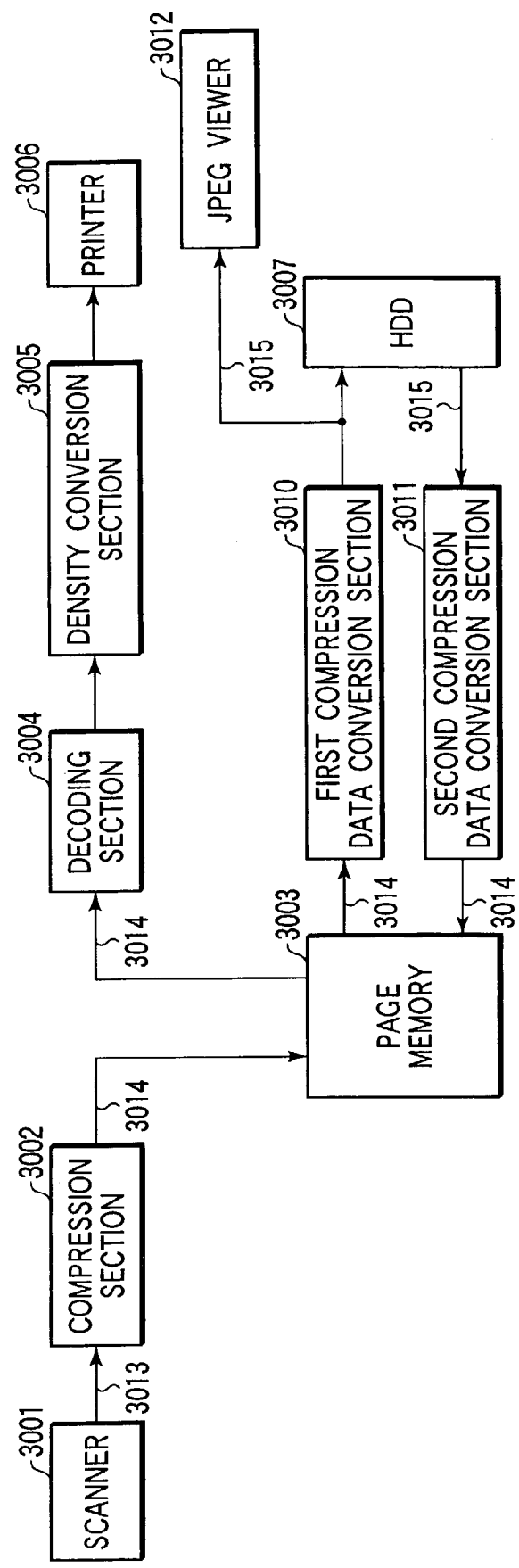
FIG. 22 is a block diagram schematically showing the structure of an MFP according to a third embodiment.

FIG. 22 schematically shows the structure of an MFP according to the third embodiment. The MFP comprises a scanner 3001, a compression section 3002, a page memory 3003, a decoding section 3004, a density conversion section 3005, a printer 3006, a first compression data conversion section 3010, a second compression data conversion section 3011, a hard disk drive (HDD) 3007 and a JPEG viewer 3012.

The third embodiment is the same as the second embodiment except for the color scanner 3001 that inputs a color image 3013, the compression section 3002 that compresses the color image, first color compression data 3014 capable of being rotated, etc., second color compression data 3015 capable of being viewed through the JPEG viewer 3012, the first compression data conversion section 3010 and second compression data conversion section 3011 that can mutually convert the first and second compression data, and the decoding section 3004 that extracts and decodes only the luminance component from the first color compression data 3014.

Figure 23:
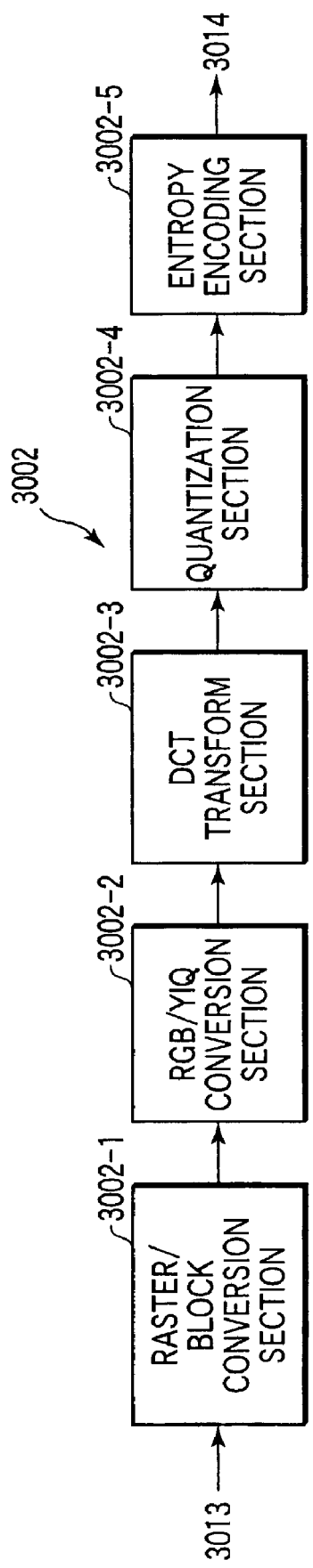
FIG. 23 shows the structure of a compression section.

FIG. 23 shows the structure of the compression section 3002. The compression section 3002 additionally comprises a RGB/YIQ conversion section 3002-2 for handling a color signal. In addition, the compression section 3002 differs from the first embodiment in that the raster/block conversion section 3002-1, DCT transform section 3002-3, quantization section 3002-4 and entropy encoding section 3002-5 are altered to be able to handle three signals, instead of a single signal.

Figure 24:
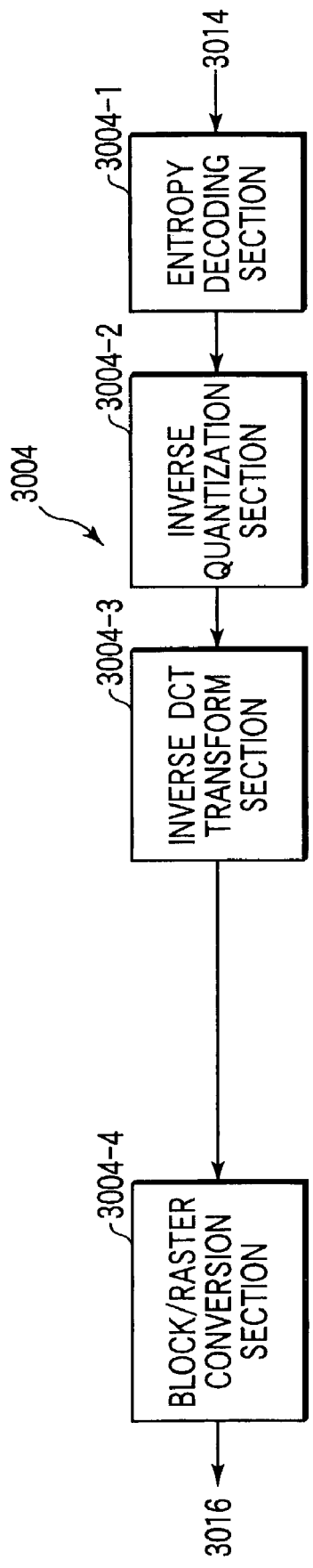
FIG. 24 shows the structure of a decoding section.

FIG. 24 shows the structure of the decoding section 3004. In the decoding section 3004, the entropy decoding section 3004-1 extracts only compression data of the luminance component from the first color compression data 3014 and entropy-decodes the compression data. In the other respects, the decoding section 3004 has the same structure as the decoding section 2004 of the second embodiment.

As has been described above, the third embodiment provides a system wherein color scanning is realized as a scan process and a black-and-white copying operation is performed in printing out a copy.

If only a black-and-white compression data component of color scan data 3013 is produced from the Huffman encoding section 3002-5 as first compression data 3014, both black-and-white scanning and black-and-white copying can be performed.

A first modification of the third embodiment will now be described.

Figure 25:
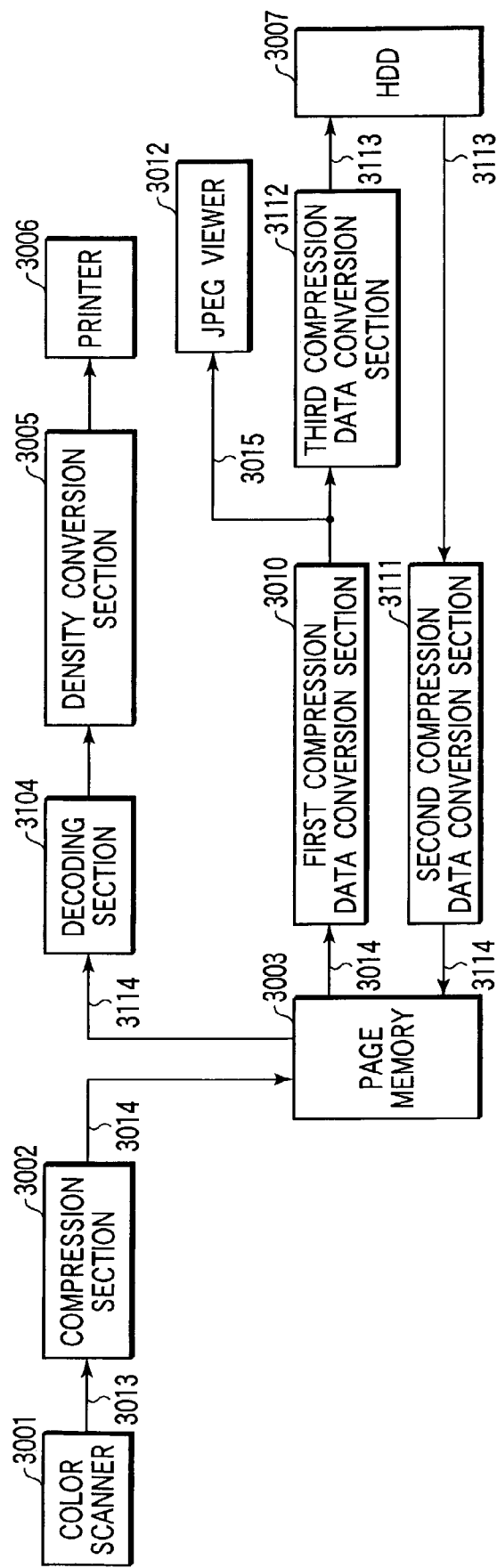
FIG. 25 shows the structure of a first modification of the third embodiment.

FIG. 25 shows the structure of the first modification of the third embodiment.

In the first modification of the third embodiment, a third compression data conversion section 3112 is provided, and the second color compression data 3015 is converted to third black-and-white compression data 3113. The second compression data conversion section 3111 converts the third black-and-white compression data 3113 to fourth black-and-white compression data 3114. The decoding section 3104 decodes the fourth black-and-white compression data 3114. In the other respects, the first modification is the same as the third embodiment.

The second compression data conversion section 3111 converts the black-and-white compression data and thus it is similar to the second compression data conversion section 2011 of the second embodiment. The decoding section 3104 is also similar to the decoding section 2004 of the second embodiment.

The third compression data conversion section 3112 converts color compression data to black-and-white compression data. With the structure of this modification, only black-and-white compression data necessary for printing is stored in the HDD for black-and-white copying. As a result, a color scan process can be realized without lowering the productivity of electronic sorting of copy.

The image processing apparatus of the third embodiment has the following structures.

That is, there is provided an image processing apparatus comprising: a compressor that converts an image signal comprising a single or plural signal components to compression data; and a decoder that decodes the compression data having a number-of-signals less than a maximum compression number-of-signals of the compressor.

There is also provided an image processing apparatus comprising: a compressor that converts an image signal comprising a single or plural signal components to compression data; and a decoder that decodes the compression data having a number-of-signals less than a maximum compression number-of-signals of the compressor, wherein the compressor converts a black-and-white signal or RGB color signals to compression data, and the decoder extracts and decodes only a luminance signal of the compression data of the black-and-white signal or the compression data of the RGB color signals.

A fourth embodiment of the invention will now be described.

Figure 26:
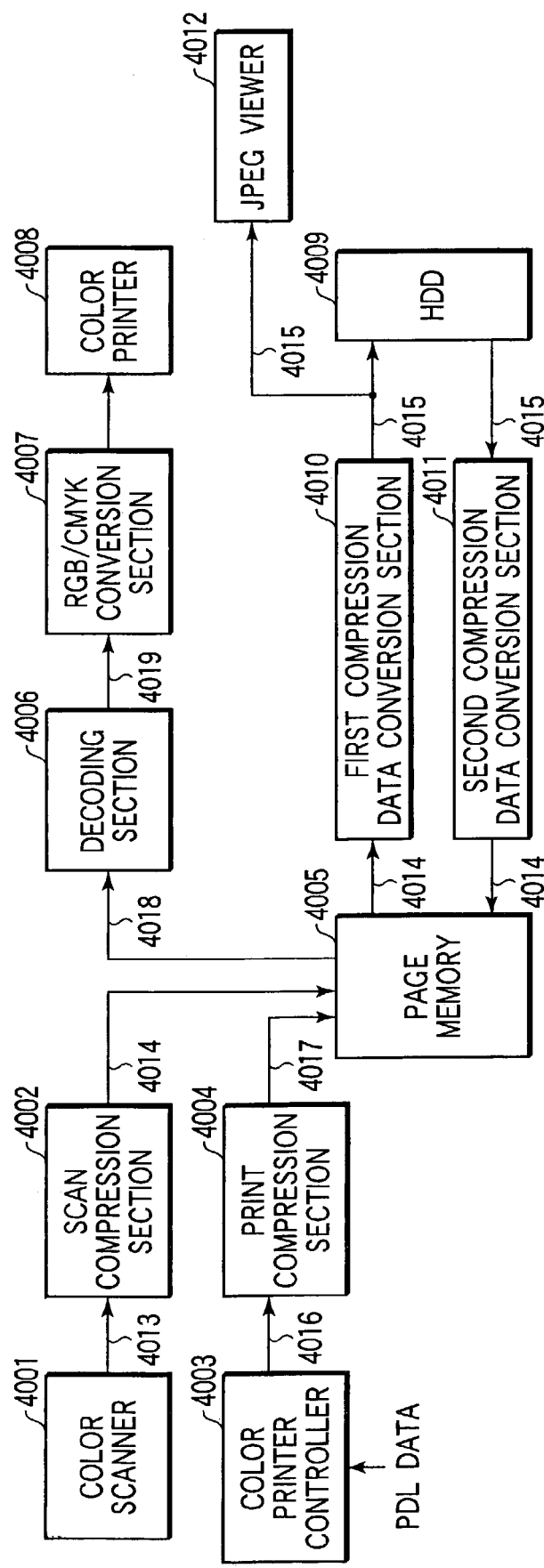
FIG. 26 is a block diagram schematically showing the structure of an MFP according to a fourth embodiment.

FIG. 26 schematically shows the structure of an MFP according to the fourth embodiment. The MFP comprises a color scanner 4001, a compression section 4002, a color printer controller 4003, a print compression section 4004, a page memory 4005, a decoding section 4006, an RGB/CMYK conversion section 4007, a color printer 4008, a first compression data conversion section 4010, a second compression data conversion section 4011, a hard disk drive (HDD) 4009, and a JPEG viewer 4012.

In a scan operation mode, a color RGB image signal 4013 read by the color scanner 4001 is compressed by the scan compression section 4002 to first color compression data 4014.

The first color compression data 4014 stored in the page memory 4005 is converted to second color compression data 4015 by the first compression data conversion section 4010. The second color compression data 4015 is transferred to the JPEG viewer 4012.

In a copying operation mode, the second color compression data 4015 is stored in the HDD 4009, and then read out and converted to the first color compression data 4014 through the second compression data conversion section 4011. The first color compression data 4014 is transferred to the decoding section 4006 as fourth color compression data 4018 via the page memory 4005.

In the copying operation mode, the decoding section 4006 generates 3Ch (RGB) image decoded signals 4019. The RGB/CMYK conversion section 4007 subjects the image decoded signals 4019 to conventionally known RGB/CMYK conversion. Thus, the color printer 4008 effects printing.

In a print operation mode, the color printer controller 4003 develops PDL data as CMYK bitmap data 4016. The print compression section 4004 compresses the CMYK bitmap data 4016 to third color compression data 4017. The third color compression data 4017 is transferred as fourth color compression data 4018 to the decoding section 4006 via the page memory 4005.

In the print operation mode, the decoding section 4006 generates 4Ch (C, M, Y, K) image decoded signals 4019. The RGB/CMYK conversion section 4007 passes the image decoded signals 4019 through. Then, the color printer 4008 effects printing.

The fourth embodiment is the same as the third embodiment except for the addition or modification of the decoding section 4006 that decodes a plurality of signals, the color printer 4008 that prints color signals, the RGB/CMYK conversion section 4007 for color-copying, the color printer controller 4003 for the color printer, and the print compression section 4004.

FIG. 27 shows the structure of the print compression section 4004. The print compression section 4004 processes color signals, which are CMYK signals. Thus, the print compression section 4004 does not effect RGB/YIQ conversion. Specifically, in the print compression section 4004, each signal is independently processed by the raster/block conversion section 4004-1, DCT transform section 4004-2 and quantization section 4004-3. Each signal is Huffman-encoded in the entropy encoding section 4004-4, and Huffman data of the four signals is combined and output as third color compression data 4017.

FIG. 28 shows the structure of the decoding section 4006.

In the decoding section 4006, when the fourth color compression data 4018 is the first color compression data, the entropy decoding section 4006-1, inverse quantization section 4006-2, inverse DCT transform section 4006-3 and block/raster conversion section 4006-5 carry out the decoding process using only three channels (3Ch) of their four signal process channels (Ch). This process is controlled by a control circuit (not shown). The YIQ/RGB conversion section 4006-4 effects conversion to RGB decoded signals.

In the decoding section 4006, when the fourth color compression data 4018 is the third color compression data, the entropy decoding section 4006-1, inverse quantization section 4006-2, inverse DCT transform section 4006-3 and block/raster conversion section 4006-5 use all of the four signal process channels (Ch). The YIQ/RGB conversion section 4006-4 effects conversion to CMYK decoded signals by passing the input through.

As has been described above, according to the fourth embodiment, the data, which has been obtained by compressing a different number of image signals in a plurality of compression sections using the same encoding method, can be decoded by a single decoding section that can decode a maximum number of signals in the system.

A compression/decoding system for a scanner process, a copy process and a printer process can be constructed by using two compression sections and one decoding section.

A first modification of the fourth embodiment will now be described.

FIG. 29 shows the structure of the first modification of the fourth embodiment.

This modification is the same as the fourth embodiment except for the scan compression section 4102, first compression data conversion section 4110 that converts first compression data 4114, second compression data conversion section 4111 and decoding section 4106.

Figures 30, 31:
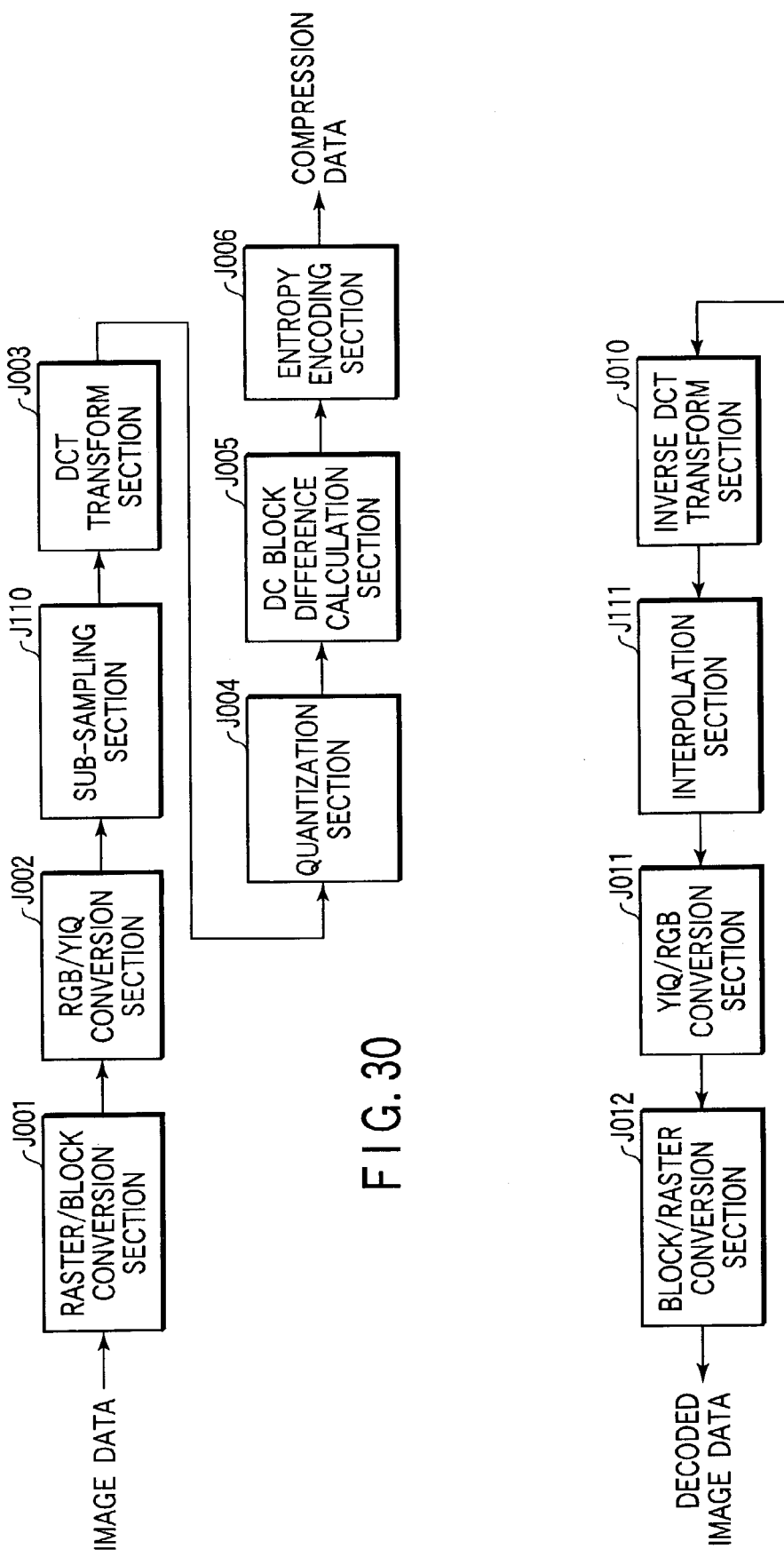
FIG. 30 is a view for describing a sub-sampling section.
FIG. 31 is a view for describing an interpolation section.

Referring to FIGS. 2 and 3 (relating to color processing (RGB/YIQ)), the JPEG compression/decoding structure has been described. Alternatively, as shown in FIGS. 30 and 31, a sub-sampling section J110 and an interpolation section J111 may be provided for compression and decoding of color signals. Thereby, more efficient compression is realized.

The sub-sampling section J110 not only enhances the compression efficiency by conversion to luminance/color difference signals. It also improves the compression efficiency by making the resolution of the color difference signal lower than that of the luminance signal. The interpolation section J111 performs a process for restoring data lost by the sub-sampling.

Figure 32:
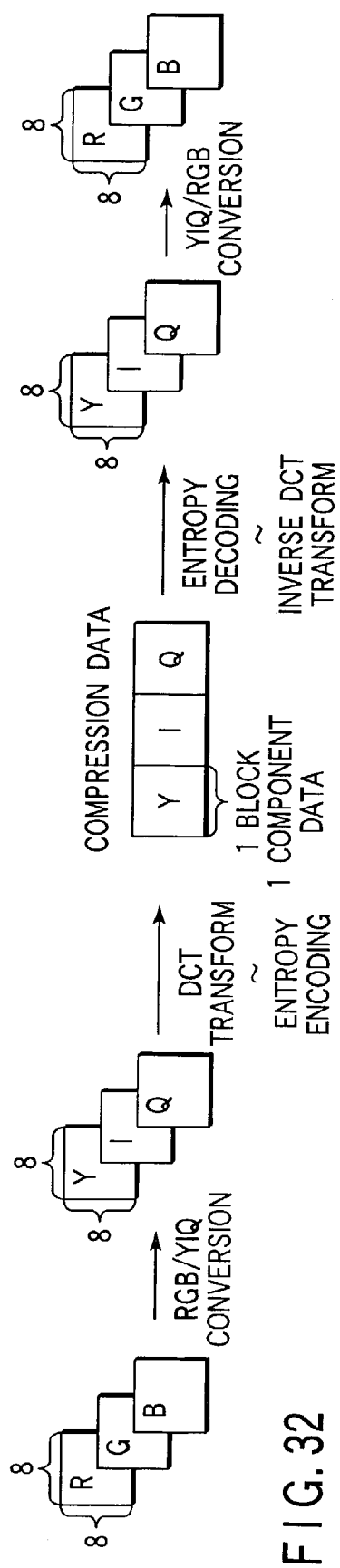
FIG. 32 illustrates a relationship between sub-sampling, interpolation and compression data.
Figure 33:
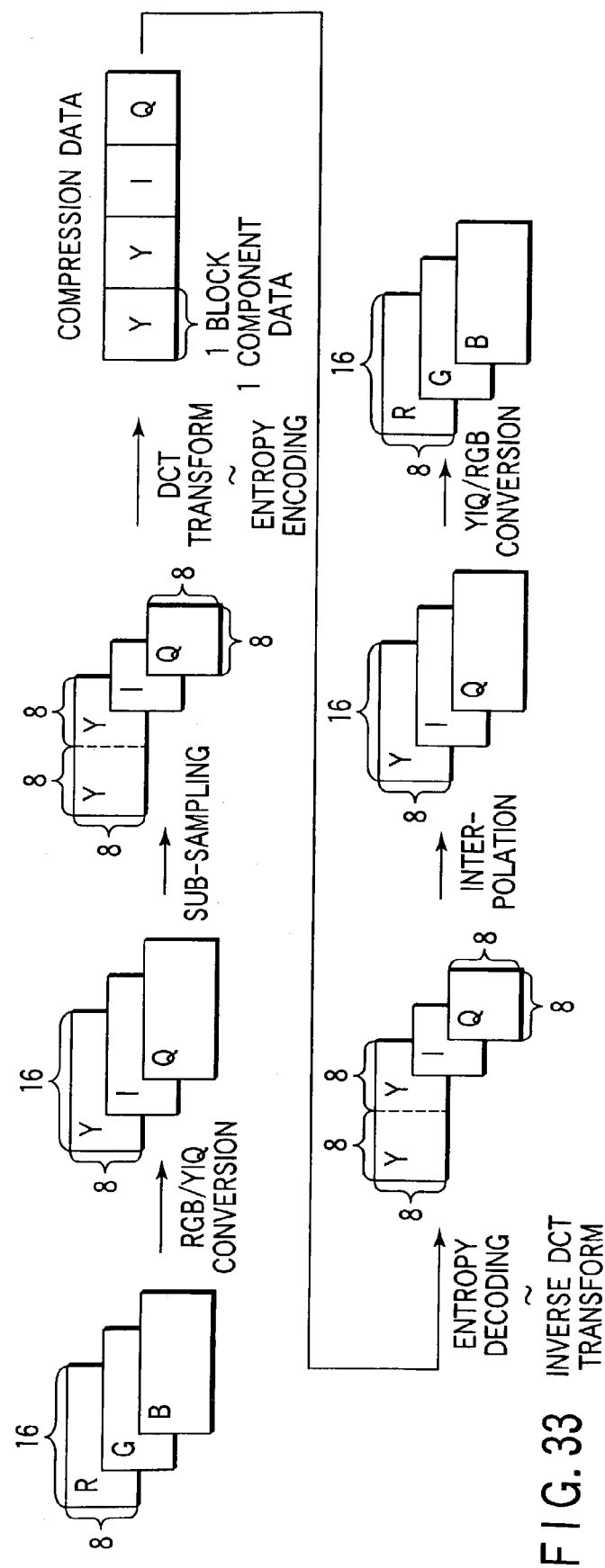
FIG. 33 illustrates a relationship between sub-sampling, interpolation and compression data.

FIGS. 32 and 33 show relationships between sub-sampling, interpolation and compression data.

In FIG. 32, in the absence of sub-sampling, compression data for three channels (3Ch) is generated for each block.

In FIG. 33, when sub-sampling is performed, the resolution of the color difference signal is reduced to half in the main scan direction. Compression data for four channels (4Ch), i.e. 2Ch for luminance components and 2Ch for color difference components, is generated per block.

The scan compression section 4102 is the same as in the fourth embodiment, except that the sub-sampling section is added. Further, the first compression data conversion section 4110 and second compression data conversion section 4111 are the same as in the fourth embodiment, except that the signals to be handled are increased from 3Ch signals to 4Ch signals.

FIG. 34 shows the structure of the decoding section 4106. As is shown in FIG. 34, an interpolation section 4106-6 is added to the decoding section 4106.

In the operation of the decoding section 4106, when the fourth color compression data 4018 is the first color compression data, the interpolation section 4106-6 performs an interpolation process. In the decoding process, three channels (3Ch) are used for the block/raster conversion section 4106-5, and all the four channels (4Ch) are used for the entropy decoding section 4006-1, inverse quantization section 4006-2 and inverse DCT transform section 4006-3.

The decoding section 4106 is the same as in the fourth embodiment except that the data is passed through the interpolation section 4106-6 when the fourth color compression data 4018 is the third color compression data.

In the rotational process, the horizontal/vertical sizes of intra-block data are altered, as shown in FIG. 35. Thus, the line memory of the block/raster conversion section 4106-5 is changed from 8 lines to 16 lines.

Where the rotational process is not performed, the increase in the line memory is needless. By using the sub-sampling for the compression of copy, the resource of the decoding section can fully be used, and the compression ratio in the sub-sampling process is realized.

In this example, the sub-sampling is used for compression for copying in order to make efficient use of resources of the decoding section. It is also possible to improve the printer compression ratio by executing sub-sampling for making the resolution of the K signal higher than the resolution of the CMY signals in association with the printer data.

In the present example, two compression sections are provided and one decoding section is used. By executing sub-sampling with this structure, the number of channels is equalized for copying and printing. Thereby, a single compression section can receive both copy data and printer data and, like the decoding section, can operate by switching over the signal characteristics. Thus, the number of compression sections can be reduced.

The image processing apparatus of the fourth embodiment has the following structures.

That is, there is provided an image processing apparatus comprising: a first compressor that converts an image signal comprising a plurality of signal components to first compression data; a second compressor that converts an image signal comprising signal components different from the signal components in the first compressor to second compression data; and a decoder that selectively decodes the first compression data or the second compression data.

There is also provided an image processing apparatus comprising: a first compressor that converts an image signal comprising a plurality of signal components to first compression data; a second compressor that converts an image signal comprising signal components different from the signal components in the first compressor to second compression data; and a decoder that selectively decodes the first compression data or the second compression data, wherein the first compressor converts a black-and-white signal or RGB color signals to first compression data, and the second compressor converts a black-and-white signal or CMYK color signals to second compression data.

Further, there is provided an image processing apparatus comprising: a first compressor that converts an image signal comprising a plurality of signal components to first compression data; a second compressor that converts an image signal comprising signal components different from the signal components in the first compressor to second compression data; and a decoder that selectively decodes the first compression data or the second compression data, wherein the first compressor converts RGB color signals to first compression data by converting the RGB color signals to luminance/color difference signals, and equalizing resolutions of the luminance and color difference or making the resolution of the luminance higher than the resolution of the color difference, the second compressor converts CMYK color signals to second compression data with equal resolutions for the respective colors, and the decoder decodes the first and second compression data comprising color components of equal resolutions in a sub-scan direction.

There is provided an image processing apparatus comprising: a first compressor that converts an image signal comprising a plurality of signal components to first compression data; a second compressor that converts an image signal comprising signal components different from the signal components in the first compressor to second compression data; and a decoder that selectively decodes the first compression data or the second compression data. In this apparatus, the first compressor converts RGB color signals to first compression data by converting RGB color signals to luminance/color difference and making a resolution of the luminance twice as high as a resolution of the color difference in a main scan direction. The second compressor converts CMYK color signals to second compression data by equalizing resolutions of the respective colors. The decoder uses two decoding channels for a luminance signal and a color-difference signal at a time of decoding the first compression data, and uses one decoding channel for each of CMYK signals at a time of decoding the second compression data.

There is provided an image processing apparatus comprising: a first compressor that converts an image signal comprising a plurality of signal components to first compression data; a second compressor that converts an image signal comprising signal components different from the signal components in the first compressor to second compression data; and a decoder that selectively decodes the first compression data or the second compression data. In this apparatus, the first compressor converts RGB color signals to first compression data by converting the RGB color signals to luminance/color difference signals, and equalizing resolutions of the luminance and color difference or making the resolution of the luminance higher than the resolution of the color difference. The second compressor converts CMYK color signals to second compression data by equalizing resolutions of the CMYK color signals or making the resolution of the K signal higher than the resolutions of the CMY signals.

Besides, there is provided an image processing apparatus having a compressor that selectively compresses first and second image signals comprising a plurality of signal components and having different numbers of signals, wherein the compressor converts the first image signal to compression data by converting RGB color signals to luminance/color difference and making a resolution of the luminance twice as high as a resolution of the color difference in a main scan direction, and converts the second image signal to compression data by equalizing resolutions of CMYK color signals.

As has been described above, according to the embodiments of the present invention, compressions for different uses, such as copying, scanning and printing, can be realized at low cost, without the need to repeat compression/decoding using a plurality of compression/decoding sections.

Further, it is possible to provide an image processing apparatus that can enhance convenience of data transmission/reception among processes and can have extensibility of system configurations for scanning and printing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus including a compression section that compresses an image signal to first compression data; a first compression data conversion section that converts the first compression data, which is compressed by the compression section, to second compression data without complete decoding of the first compression data; and a second compression data conversion section that converts the second compression data, which is converted by the first compression data conversion section, to the first compression data without complete decoding of the second compression data, wherein the first compression data is fixed-length code data, and the second compression data is variable-length code data having a code amount equal to or less than a code amount of the first compression data, the compression section, in entropy encoding, provides an effective code marker at a terminal end of an effective code in units of a block, and compresses the first compression data to a predetermined code length in units of a block by using an effective code, an effective marker and an invalid code, the first compression data conversion section includes a first boundary search section that performs a pattern matching for the first compression data and searches for an effective code boundary of each block, and a boundary marker insertion section that removes the invalid code and inserts a block boundary marker, and the second compression data conversion section includes a second boundary search section that performs a pattern matching for the second compression data and searches for the block boundary marker, a code length determination section that determines whether a total code length of the effective code and the effective code marker is shorter than a predetermined code length, and an invalid code insertion section that inserts the invalid code when it is determined that the code length excluding the block boundary marker is shorter.

2. The image processing apparatus according to claim 1, wherein the image processing apparatus includes a third compression data conversion section having a third boundary search section that performs a pattern matching for the second compression data and searches for a block boundary marker, and a marker removal section that removes the block boundary marker and an effective code marker, and the second compression data is converted to third compression data without complete decoding of the second compression data.

3. An image processing apparatus including a compression section that compresses an image signal to first compression data; a first compression data conversion section that converts the first compression data, which is compressed by the compression section, to second compression data without complete decoding of the first compression data, and a second compression data conversion section that converts the second compression data, which is converted by the first compression data conversion section, to the first compression data without complete decoding of the second compression data, wherein the first compression data is fixed-length code data, and the second compression data is variable-length code data having a code amount equal to or less than a code amount of the first compression data, the compression section compresses the image signal to the first compression data using a sequential conversion and an entropy encoding that uses a run-length in order of priority of an intra-block sequential conversion result and inserts a terminal end marker, which indicates continuity of data up to a terminal end, in place of the run-length, when data continues up to the terminal end, and wherein the compression section includes a sequence correction section that corrects a terminal end sequential conversion result such that the terminal end marker always occurs in the entropy encoding, and compresses the first compression data to a predetermined code length in units of a block using an effective code, the terminal end marker and an invalid code.

4. An image processing apparatus including a compression section that compresses an image signal to first compression data using a sequential conversion and an entropy encoding; a first compression data conversion section that converts the first compression data, which is compressed by the compression section, to second compression data without complete decoding of the first compression data; and a second compression data conversion section that converts the second compression data, which is converted by the first compression data conversion section, to the first compression data without complete decoding of the second compression data, wherein the compression section, in the entropy encoding, compresses the first compression data to a predetermined code length in units of a block using an effective code and an invalid code in units of a block, the first compression data conversion section includes a first boundary search section that performs an entropy decoding for the first compression data and searches for an effective code boundary of each block, and an invalid code deletion section that removes the invalid code, and the second compression data conversion section includes a second boundary search section that performs an entropy decoding for the second compression data and searches for the effective code boundary of each block, a code length determination section that determines whether an effective code length is shorter than a predetermined code length, and an invalid code insertion section that inserts the invalid code at the effective code boundary when it is determined that the code length is shorter.

5. The image processing apparatus according to claim 4, wherein the compression section includes a first memory clear section that inserts the invalid code in a predetermined code length memory area in units of a block in the entropy encoding, and a first memory write section that writes the effective code in the memory area by adjusting the code amount of the effective code such that the effective code has a predetermined code length or less in units of a block, whereby the compression section compresses the first compression data to a predetermined code length in units of a block.

6. The image processing apparatus according to claim 4, wherein the second compression data conversion section includes a second boundary search section that performs an entropy decoding for the second compression data and searches for the effective code boundary of each block, a second memory clear section that inserts the invalid code in a predetermined code length memory area, and a second memory write section that extracts the effective code of the block and writes the effective code in the memory area, whereby the second compression data conversion section converts the second compression data to the first compression data.

7. An image processing apparatus including a first compression section that compresses an image signal to first compression data using a sequential conversion and an entropy encoding; a first compression data conversion section that converts the first compression data to second compression data without complete decoding of the first compression data; a second compression data conversion section that converts the second compression data to the first compression data without complete decoding of the second compression data; and a second compression section that compresses and decodes the second compression data, wherein the first compression section, in the entropy encoding, compresses the first compression data to a predetermined code length in units of a block using an effective code and an invalid code in units of a block, the first compression data conversion section includes a first boundary search section that performs an entropy decoding for the first compression data and searches for an effective code boundary of each block, and an invalid code deletion section that removes the invalid code, and the second compression data conversion section includes a second boundary search section that performs an entropy decoding for the second compression data and searches for the effective code boundary of each block, a code length determination section that determines whether an effective code length is longer or shorter than a predetermined code length, a code length adjustment section that alters the code length to the predetermined code length when the code length is determined to be longer, and an invalid code insertion section that inserts the invalid code at the effective code boundary when the code length is determined to be shorter.

8. An image processing apparatus including a compression section that compresses an image signal to first compression data in units of a block; a first compression data conversion section that converts the first compression data, which is compressed by the compression section, to second compression data without complete decoding of the first compression data; and a second compression data conversion section that converts the second compression data, which is converted by the first compression data conversion section, to the first compression data without complete decoding of the second compression data, wherein the first compression data is independent as a block, and the second compression data is data compressed using a correlation with another block, the compression section, in the entropy encoding, compresses the first compression data to a predetermined code length in a block-independent manner, using an effective code and an invalid code in units of a block, the first compression data conversion section includes a first boundary search section that performs an entropy decoding for the first compression data and searches for an effective code boundary of each block, an invalid code deletion section that removes the invalid code, a decoding extraction section that extracts only an entropy decoding result of a specific sequence, a difference calculation section that calculates a difference of the specific entropy decoding result from an adjacent block, an entropy encoding section that entropy-encodes the difference result, a sequence decoding section that sequence-decodes only the entropy encoding result, a difference calculation section that calculates a difference of the specific decoding sequence from the adjacent block, and the difference result, and the second compression data conversion section includes a second boundary search section that performs an entropy decoding for the second compression data and searches for the effective code boundary of each block, a code length determination section that determines whether an effective code length is longer or shorter than a predetermined code length, and a code length adjustment section that alters the code length to the predetermined code length when the code length is determined to be longer, whereby the second compression data conversion section converts the second compression data to the first compression data.

* * * * *